(12) United States Patent
Huang et al.

(10) Patent No.: US 8,379,323 B2
(45) Date of Patent: Feb. 19, 2013

(54) OPTICAL IMAGE CAPTURING LENS ASSEMBLY

(75) Inventors: Hsin-Hsuan Huang, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 28 days.

(21) Appl. No.: 13/241,283

(22) Filed: Sep. 23, 2011

(65) Prior Publication Data

US 2012/0314301 A1  Dec. 13, 2012

(30) Foreign Application Priority Data

Jun. 10, 2011 (TW) ................................ 100120398

(51) Int. Cl.
*G02B 3/02* (2006.01)
*G02B 9/08* (2006.01)
*G02B 9/62* (2006.01)

(52) U.S. Cl. ........ 359/713; 359/738; 359/740; 359/756; 359/757; 359/758; 359/759; 359/760

(58) Field of Classification Search .................. 359/713, 359/738–740, 756–760
See application file for complete search history.

(56) References Cited

U.S. PATENT DOCUMENTS

| 7,365,920 B2 | 4/2008 | Noda | |
|---|---|---|---|
| 2010/0265593 A1* | 10/2010 | Tang | 359/738 |
| 2012/0188654 A1* | 7/2012 | Huang | 359/713 |
| 2012/0194726 A1* | 8/2012 | Huang et al. | 359/713 |

* cited by examiner

*Primary Examiner* — Evelyn A. Lester
(74) *Attorney, Agent, or Firm* — CKC & Partners Co., Ltd.

(57) ABSTRACT

An optical image capturing lens assembly includes, in order from an object side to an image side, a first lens element, a second lens element, a third lens element, a fourth lens element, a fifth lens element, and a sixth lens element. The first lens element with positive refractive power has a convex object-side surface. The object-side surface and the image-side surface of the fifth lens element are aspheric and at least one of the object-side surface and the image-side surface has at least one inflection point formed thereon. The sixth lens element with negative refractive power has a concave object-side surface and a convex image-side surface, wherein the object-side surface and the image-side surface of the sixth lens element are aspheric.

25 Claims, 21 Drawing Sheets

OPTICAL IMAGE CAPTURING LENS ASSEMBLY

RELATED APPLICATIONS

The application claims priority to Taiwan Application Serial Number 100120398, filed Jun. 10, 2011, which is herein incorporated by reference.

BACKGROUND

1. Technical Field

The present invention relates to an optical image capturing lens assembly. More particularly, the present invention relates to a compact optical image capturing lens assembly applicable to electronic products.

2. Description of Related Art

In recent years, with the popularity of mobile products with camera functionalities, the demand for compact optical image capturing lens assemblies is increasing. The sensor of a conventional optical image capturing camera is typically a CCD (Charge-Coupled Device) image sensor or a CMOS (Complementary Metal-Oxide-Semiconductor) sensor. As advanced semiconductor manufacturing technologies have allowed the pixel size to be reduced and compact optical image capturing lens assemblies have gradually evolved toward higher megapixels, there is an increasing demand for compact optical image capturing lens assemblies featuring better image quality.

A conventional compact optical image capturing lens assembly employed in a portable electronic product typically utilizes a four-element lens structure. Due to the popularity of mobile products with high specifications, such as smart phones and PDAs (Personal Digital Assistants), the pixel and image-quality requirements of the compact optical image capturing lens assembly have increased rapidly. However, the conventional four-element lens structure cannot satisfy such requirements of the compact optical image capturing lens assembly. Furthermore, the trend in modern electronics is for increasingly higher performance and compact size. Therefore, a need exists in the art for providing an optical image capturing lens assembly for use in portable mobile electronics that has excellent imaging quality while avoiding a long total track length.

SUMMARY

According to one aspect of the present disclosure, an optical image capturing lens assembly includes, in order from an object side to an image side, a first lens element, a second lens element, a third lens element, a fourth lens element, a fifth lens element and a sixth lens element. The first lens element has positive refractive power and has a convex object-side surface. The second lens element has refractive power. The third lens element has refractive power. The fourth lens element has refractive power. The fifth lens element has refractive power, wherein the object-side surface and the image-side surface of the fifth lens element are aspheric, and the fifth lens element has at least one inflection point formed on at least one of the object-side surface and the image-side surface thereof. The sixth lens element has negative refractive power, and has a concave object-side surface and a convex image-side surface, wherein the object-side surface and the image-side surface of the sixth lens element are aspheric. The optical image capturing lens assembly further includes a stop. When a sum of the central thickness from the first lens element to the sixth lens element is $\Sigma CT$, an axial distance between the object-side surface of the first lens element and the image-side surface of the sixth lens element is TD, and an axial distance between the stop and the image-side surface of the sixth lens element is SD, the following relationships are satisfied:

$$0.5 < \Sigma CT/TD < 0.92; \text{ and}$$

$$0.7 < SD/TD < 1.2.$$

According to another aspect of the present disclosure, an optical image capturing lens assembly includes, in order from an object side to an image side, a first lens element, a second lens element, a third lens element, a fourth lens element, a fifth lens element and a sixth lens element. The first lens element has positive refractive power and has a convex object-side surface. The second lens element has negative refractive power. The third lens element has refractive power, wherein the object-side surface and the image-side surface of the third lens element are aspheric, and the third lens element has at least one inflection point formed on at least one of the object-side surface and the image-side surface thereof. The fourth lens element has refractive power, wherein the object-side surface and the image-side surface of the fourth lens element are aspheric, and the fourth lens element has at least one inflection point formed on at least one of the object-side surface and the image-side surface thereof. The fifth lens element has refractive power, wherein the object-side surface and the image-side surface of the fifth lens element are aspheric, and the fifth lens element has at least one inflection point formed on at least one of the object-side surface and the image-side surface thereof. The sixth lens element has negative refractive power, and has a concave object-side surface and a convex image-side surface, wherein the object-side surface and the image-side surface of the sixth lens element are aspheric, and the sixth lens element has at least one inflection point formed on at least one of the object-side surface and the image-side surface thereof. When a focal length of the optical image capturing lens assembly is f, and a curvature radius of the object-side surface of the sixth lens element is R11, the following relationship is satisfied:

$$-0.7 < R11/f < 0.$$

According to further another aspect of the present disclosure, an optical image capturing lens assembly includes, in order from an object side to an image side, a first lens element, a second lens element, a third lens element, a fourth lens element, a fifth lens element and a sixth lens element. The first lens element has positive refractive power and has a convex object-side surface. The second lens element has refractive power. The third lens element has refractive power, wherein at least one of the object-side surface and the image-side surface of the third lens element is aspheric. The fourth lens element has refractive power, wherein at least one of the object-side surface and the image-side surface of the fourth lens element is aspheric. The fifth lens element has refractive power, wherein the object-side surface and the image-side surface of the fifth lens element are aspheric, and the fifth lens element has at least one inflection point formed on at least one of the object-side surface and the image-side surface thereof. The sixth lens element has negative refractive power, and has a concave object-side surface and a convex image-side surface. The optical image capturing lens assembly further includes a stop, wherein when an axial distance between the stop and the image-side surface of the sixth lens element is SD, and an axial distance between the object-side surface of the first lens element and the image-side surface of the sixth lens element is TD, the following relationship is satisfied:

$$0.9 < SD/TD < 1.2.$$

DETAILED DESCRIPTION

Figure 1:
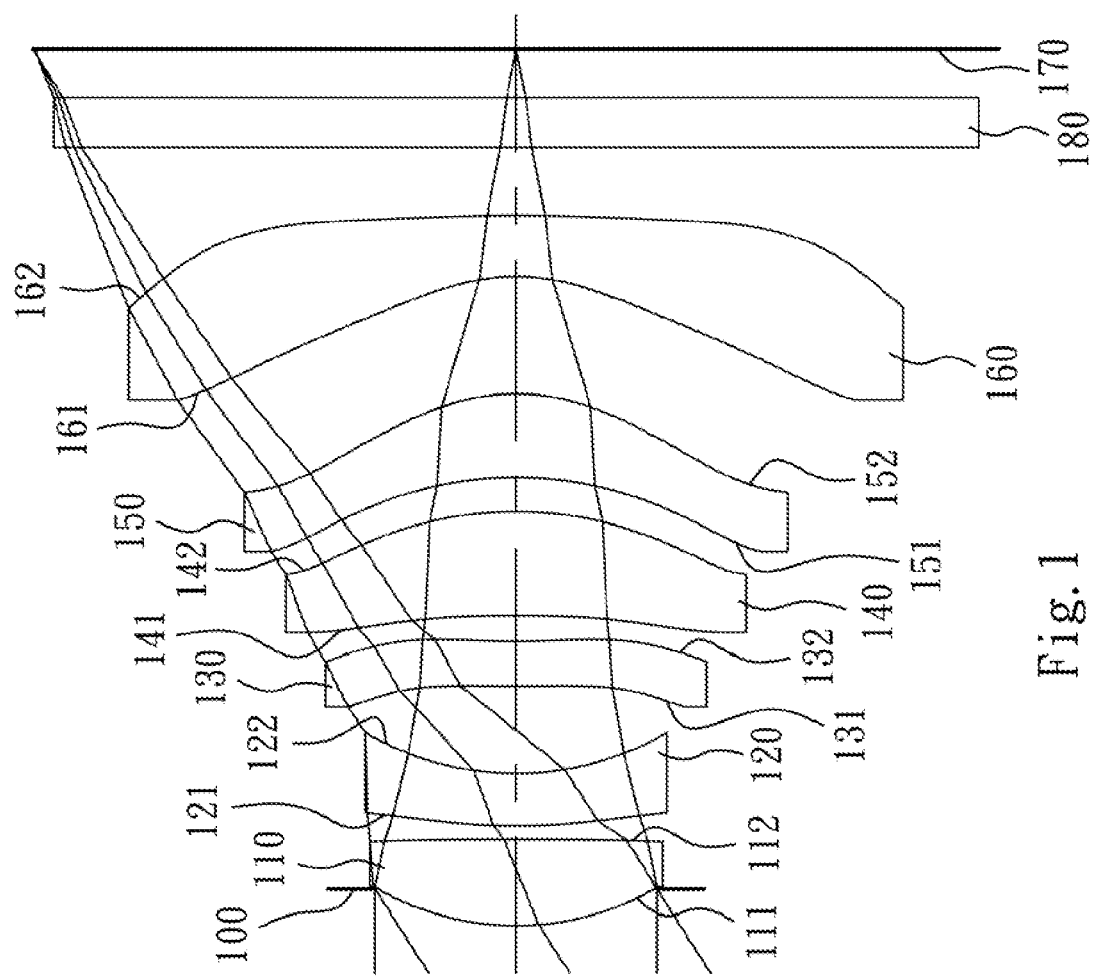
FIG. 1 is a schematic view of an optical image capturing lens assembly according to the first embodiment of the present disclosure.

An optical image capturing lens assembly includes, in order from an object side to an image side, a first lens element, a second lens element, a third lens element, a fourth lens element, a fifth lens element and a sixth lens element. The optical image capturing lens assembly further includes an image sensor located on an image plane.

The first lens element with positive refractive power provides partial refractive power for reducing the total track length of the optical image capturing lens assembly. The first lens element can have a convex object-side surface and a convex image-side surface, or a convex object-side surface and a concave image-side surface such as a meniscus. When the first lens element has a convex object-side surface and a convex image-side surface, the refractive power of the first lens element can be enhanced for reducing the total track length thereof. When the first lens element is a meniscus, the spherical aberration of the optical image capturing lens assembly can be corrected.

The second lens element with negative refractive power can correct the aberration generated from the first lens element and the chromatic aberration of the optical image capturing lens assembly. The second lens element has a concave image-side surface, so that the aberration of the optical image capturing lens assembly can be corrected.

The fifth lens element has a convex image-side surface, so that the astigmatism and the high order aberration of the optical image capturing lens assembly can be corrected.

The sixth lens element with negative refractive power has a concave object-side surface and a convex image-side surface. Thus, the high order aberrations can be corrected while having moderate total track length of the optical image capturing lens assembly so as to maintain the compact size of the optical image capturing lens assembly.

When a sum of the central thickness from the first lens element to the sixth lens element is $\Sigma CT$, and an axial distance between the object-side surface of the first lens element and the image-side surface of the sixth lens element is TD, the following relationship is satisfied:

$$0.5 < \Sigma CT/TD < 0.92.$$

Therefore, the optical image capturing lens assembly can provide high image quality, and the total track length of the optical image capturing lens assembly can be reduced to thereby allow for use in compact electronic products.

The optical image capturing lens assembly may further include a stop. In this case, when the axial distance between the object-side surface of the first lens element and the image-side surface of the sixth lens element is TD, and an axial distance between the stop and the image-side surface of the sixth lens element is SD, the following relationship is satisfied:

$$0.7 < SD/TD < 1.2.$$

If SD/TD<0.7, the angle of incidence on the image sensor would be too large, which would cause poor photographic performance of the image sensor as well as excessive chromatic aberrations within the optical image capturing lens assembly. If SD/TD>1.2, the total track length of the optical image capturing lens assembly would be too long. Therefore, when SD/TD satisfies the above relationship, the optical image capturing lens assembly has a good balance between the telecentric and the wide-angle characteristic, and a desirable total track length of the optical image capturing lens assembly can be maintained.

SD and TD can further satisfy the following relationship:

$$0.9 < SD/TD < 1.2.$$

When a focal length of the optical image capturing lens assembly is f, and a curvature radius of the object-side surface of the sixth lens element is R11, the following relationship is satisfied:

$-0.7 < R11/f < 0.$

Therefore, the manufacture and fabrication of the sixth lens element is more easily realized due to the curvature thereof, and the curvature of the sixth lens element can further correct the high order aberration of the optical image capturing lens assembly.

R11 and f can further satisfy the following relationship:

$-0.4 < R11/f < -0.1.$

When the focal length of the optical image capturing lens assembly is f, and a composite focal length of the third lens element, the fourth lens element and the fifth lens element is f345, the following relationship is satisfied:

$1.3 < f/f345 < 2.0.$

Therefore, the composite focal length of the third lens element, the fourth lens element and the fifth lens element can reduce the total track length of the optical image capturing lens assembly, and can further prevent the aberration thereof being too large.

When a half of a diagonal length of an effective photosensitive area of the image sensor is ImgH, and the focal length of the optical image capturing lens assembly is f, the following relationship is satisfied:

$0.6 < ImgH/f < 0.9.$

Therefore, a sufficient angle of view of the optical image capturing lens assembly can be ensured.

When a horizontal distance between the position of the maximum range of the incident light passing through the object-side surface of the first lens element and the intersection point of the optical axis and the object-side surface of the first lens element is SAG11, and a central thickness of the sixth lens element is CT6, the following relationship is satisfied:

$-3.0 < SAG11/CT6 < -1.0.$

SAG11 represents the curvature of the object-side surface of the first lens element. Moreover, when the curvature of the object-side surface of the first lens element is too large, the manufacture of the first lens element becomes more difficult. Therefore, when SAG11/CT6 satisfies the above relationship, the object-side surface of the first lens element is more suitable for the manufacture of the first lens element.

When a curvature radius of the object-side surface of the second lens element is R3, and a curvature radius of the image-side surface of the second lens element is R4, the following relationship is satisfied:

$0.2 < (R3+R4)/(R3-R4) < 4.0.$

Therefore, the above relationship enables the aberration of the first lens element to be corrected by the second lens element, so that the high order aberration of the optical image capturing lens assembly can be avoided.

When the Abbe number of the first lens element is V1, and the Abbe number of the second lens element is V2, the following relationship is satisfied:

$25 < V1-V2 < 45.$

Therefore, the chromatic of the optical image capturing lens assembly can be corrected.

When a curvature radius of the object-side surface of the first lens element is R1, and a curvature radius of the image-side surface of the first lens element is R2, the following relationship is satisfied:

$-1.5 < (R1+R2)/(R1-R2) < -0.3.$

Therefore, the spherical aberration of the optical image capturing lens assembly can be corrected.

When the focal length of the optical image capturing lens assembly is f, and a focal length of the first lens element is f1, the following relationship is satisfied:

$1.0 < f/f1 < 1.8.$

Therefore, the refractive power of the first lens element is proper within the optical image capturing lens assembly, so that the total track length of the optical image capturing lens assembly can be controlled and the spherical aberration thereof can be avoided.

When an axial distance between the first lens element and the second lens element is T12, and an axial distance between the second lens element and the third lens element is T23, the following relationship is satisfied:

$0.05 < T12/T23 < 0.8.$

Therefore, the disposition of the second lens element is conducive for reducing the total track length of the optical image capturing lens assembly.

When the half of a diagonal length of an effective photosensitive area of the image sensor is ImgH, and an axial distance between the object-side surface of the first lens element and the image plane is TTL, the following relationship is satisfied:

$TTL/ImgH < 2.1.$

Therefore, the total track length of the optical image capturing lens assembly can be reduced, so as to maintain the compact size of the optical image capturing lens assembly. As a result, the optical image capturing lens assembly may be employed in lightweight and portable electronic products.

The optical image capturing lens assembly of the present disclosure includes at least four lens elements which are made of plastic material. When the lens elements are made of plastic material, the cost of manufacture can be effectively reduced. The lens elements also can be made of glass material, so that the freedom of the power allocation of the optical image capturing lens assembly can be increased. Furthermore, the surface of each lens element can be aspheric, so that it is easier to make the surface into other non-spherical shapes. As a result, more controllable variables are obtained, and the aberration and the number of required lens elements are reduced. Therefore, the total track length of the optical image capturing lens assembly can be reduced.

The lens elements can have inflection points formed on the surfaces thereof. Therefore, the incident angle of the off-axis field of light on the image sensor can be effectively minimized and the aberration of the off-axis field can be corrected.

According to the optical image capturing lens assembly of the present disclosure, when the lens element has a convex surface, this indicates that the paraxial region of the surface is convex, and when the lens element has a concave surface, this indicates that the paraxial region of the surface is concave.

According to the optical image capturing lens assembly of the present disclosure, the optical image capturing lens assembly can include at least one stop for reducing stray light while retaining high image quality. Furthermore, when the stop is an aperture stop, the position of the aperture stop within an optical system can be arbitrarily placed in front of the entire optical system or within the optical system depending on the preference of the designer of the optical system, in order to achieve the desirable optical features or higher image quality produced from the optical system.

According to the above description of the present disclosure, the following 1st-10th specific embodiments are provided for further explanation.

Figure 2:
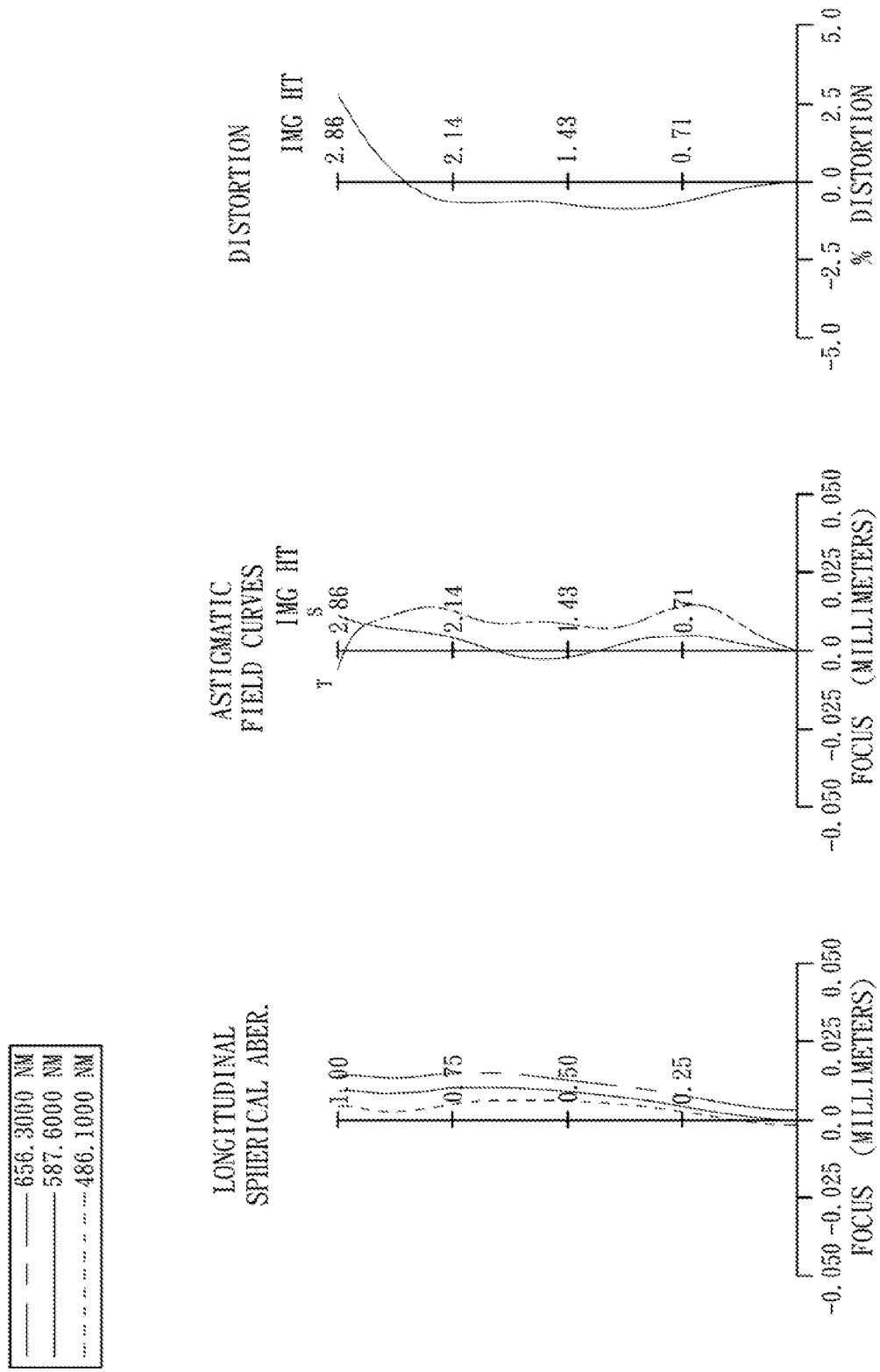
FIG. 2 shows spherical aberration curves, astigmatic field curves and a distortion curve of the optical image capturing lens assembly according to the first embodiment.

FIG. 1 is a schematic view of an optical image capturing lens assembly according to the first embodiment of the present disclosure. FIG. 2 shows spherical aberration curves, astigmatic field curves and a distortion curve of the optical image capturing lens assembly according to the first embodiment. In FIG. 1, the optical image capturing lens assembly includes, in order from an object side to an image side, an aperture stop 100, the first lens element 110, the second lens element 120, the third lens element 130, the fourth lens element 140, the fifth lens element 150, the sixth lens element 160, an IR (infrared) cut filter 180 and an image plane 170.

The first lens element 110 is made of plastic material. The first lens element 110 with positive refractive power has a convex object-side surface 111 and a convex image-side surface 112. The object-side surface 111 and the image-side surface 112 of the first lens element 110 are aspheric.

The second lens element 120 is made of plastic material. The second lens element 120 with negative refractive power has a convex object-side surface 121 and a concave image-side surface 122. The object-side surface 121 and the image-side surface 122 of the second lens element 120 are aspheric.

The third lens element 130 is made of plastic material. The third lens element 130 with negative refractive power has a convex object-side surface 131 and a concave image-side surface 132. The object-side surface 131 and the image-side surface 132 of the third lens element 130 are aspheric. The third lens element 130 has inflection points formed on the object-side surface 131 thereof.

The fourth lens element 140 is made of plastic material. The fourth lens element 140 with positive refractive power has a concave object-side surface 141 and a convex image-side surface 142. The object-side surface 141 and the image-side surface 142 of the fourth lens element 140 are aspheric. The fourth lens element 140 has inflection points formed on the object-side surface 141 and the image-side surface 142 thereof.

The fifth lens element 150 is made of plastic material. The fifth lens element 150 with positive refractive power has a concave object-side surface 151 and a convex image-side surface 152. The object-side surface 151 and the image-side surface 152 of the fifth lens element 150 are aspheric. The fifth lens element 150 has inflection points formed on the object-side surface 151 and the image-side surface 152 thereof.

The sixth lens element 160 is made of plastic material. The sixth lens element 160 with negative refractive power has a concave object-side surface 161 and a convex image-side surface 162. The object-side surface 161 and the image-side surface 162 of the sixth lens element 160 are aspheric. The sixth lens element 160 has inflection points formed on the object-side surface 161 thereof.

The IR cut filter 180 is made of glass and located between the sixth lens element 160 and the image plane 170, and will not affect the focal length of the optical image capturing lens assembly.

The equation of the aspheric surface profiles of the aforementioned lens elements of the first embodiment is expressed as follows:

$$X(Y) = (Y^2/R)/(1 + \text{sqrt}(1 - (1+k) \times (Y/R)^2)) + \sum_i (Ai) \times (Y^i)$$

where:

X is the height of a point on the aspheric surface spaced at a distance Y from the optical axis relative to the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the optical image capturing lens assembly according to the first embodiment, when a focal length of the optical image capturing lens assembly is f, an f-number of the optical image capturing lens assembly is Fno, and a half of the maximal field of view is HFOV, these parameters have the following values:

f=4.35 mm;

Fno=2.60; and

HFOV=32.6 degrees.

In the optical image capturing lens assembly according to the first embodiment, when the Abbe number of the first lens element 110 is V1, and the Abbe number of the second lens element 120 is V2, the following relationship is satisfied:

$V1-V2=32.7$.

In the optical image capturing lens assembly according to the first embodiment, when an axial distance between the first lens element 110 and the second lens element 120 is T12, and an axial distance between the second lens element 120 and the third lens element 130 is T23, the following relationship is satisfied:

$T12/T23=0.16$.

In the optical image capturing lens assembly according to the first embodiment, when a sum of the central thickness from the first lens element 110 to the sixth lens element 160 is ΣCT, and an axial distance between the object-side surface 111 of the first lens element 110 and the image-side surface 162 of the sixth lens element 160 is TD, the following relationship is satisfied:

$ΣCT/TD=0.61$.

In the optical image capturing lens assembly according to the first embodiment, when a curvature radius of the object-side surface 111 of the first lens element 110 is R1, and a curvature radius of the image-side surface 112 of the first lens element 110 is R2, the following relationship is satisfied:

$(R1+R2)/(R1-R2)=-0.82$.

In the optical image capturing lens assembly according to the first embodiment, when a curvature radius of the object-side surface 121 of the second lens element 120 is R3, and a curvature radius of the image-side surface 122 of the second lens element 120 is R4, the following relationship is satisfied:

$(R3+R4)/(R3-R4)=2.48$.

In the optical image capturing lens assembly according to the first embodiment, when the focal length of the optical image capturing lens assembly is f, and a curvature radius of the object-side surface 161 of the sixth lens element 160 is R11, the following relationship is satisfied:

$R11/f=-0.26$.

In the optical image capturing lens assembly according to the first embodiment, when the focal length of the optical image capturing lens assembly is f, and a focal length of the first lens element 110 is f1, the following relationship is satisfied:

$$f/f1=1.51.$$

In the optical image capturing lens assembly according to the first embodiment, when the focal length of the optical image capturing lens assembly is f, and a composite focal length of the third lens element 130, the fourth lens element 140 and the fifth lens element 150 is f345, the following to relationship is satisfied:

$$f/f345=1.56.$$

In the optical image capturing lens assembly according to the first embodiment, when an axial distance between the stop 100 and the image-side surface 162 of the sixth lens element 160 is SD, and the axial distance between the object-side surface 111 of the first lens element 110 and the image-side surface 162 of the sixth lens element 160 is TD, the following relationship is satisfied:

$$SD/TD=0.95.$$

Figure 21:
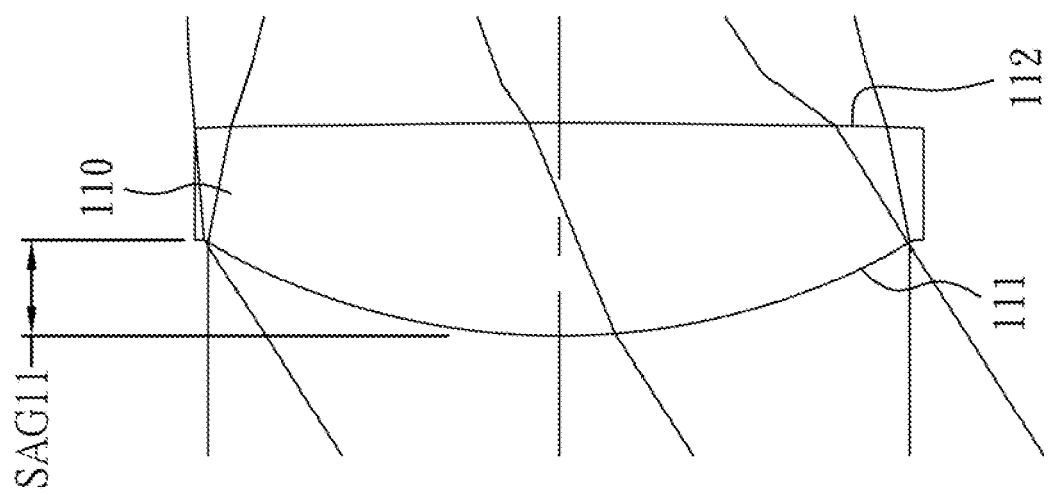
FIG. 21 shows incident light passing through a first lens element of the optical image capturing lens assembly according to the first embodiment.

FIG. 21 shows incident light passing through the first lens element 110 of the optical image capturing lens assembly according to the first embodiment. When a horizontal distance between the position of the maximum range of the incident light passing through the object-side surface 111 of the first lens element 110 and the intersection point of the optical axis and the object-side surface 111 of the first lens element 110 is SAG11, and a central thickness of the sixth lens element 160 is CT6, the following relationship is satisfied:

$$SAG11/CT6=-2.00.$$

In the optical image capturing lens assembly according to the first embodiment, when a half of a diagonal length of an effective photosensitive area of the image sensor is ImgH, the focal length of the optical image capturing lens assembly is f, and an axial distance between the object-side surface 111 of the first lens element 110 and the image plane 170 is TTL, the following relationships are satisfied:

$$ImgH/f=0.66; \text{ and}$$

$$TTL/ImgH=1.78.$$

The detailed optical data of the first embodiment are shown in Table 1 and the aspheric surface data are shown in Table 2 below.

TABLE 1

1st Embodiment
f = 4.35 mm, Fno = 2.60, HFOV = 32.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.215 | | | | |
| 2 | Lens 1 | 1.705590 (ASP) | 0.510 | Plastic | 1.543 | 56.5 | 2.88 |
| 3 | | −16.968700 (ASP) | 0.084 | | | | |
| 4 | Lens 2 | 3.743300 (ASP) | 0.304 | Plastic | 1.634 | 23.8 | −4.62 |
| 5 | | 1.591560 (ASP) | 0.523 | | | | |
| 6 | Lens 3 | 12.944900 (ASP) | 0.264 | Plastic | 1.634 | 23.8 | −13.15 |
| 7 | | 5.030900 (ASP) | 0.150 | | | | |
| 8 | Lens 4 | −11.099500 (ASP) | 0.620 | Plastic | 1.544 | 55.9 | 5.02 |
| 9 | | −2.235890 (ASP) | 0.200 | | | | |
| 10 | Lens 5 | −2.283450 (ASP) | 0.500 | Plastic | 1.544 | 55.9 | 4.16 |
| 11 | | −1.225000 (ASP) | 0.695 | | | | |
| 12 | Lens 6 | −1.132790 (ASP) | 0.365 | Plastic | 1.544 | 55.9 | −2.42 |
| 13 | | −8.928600 (ASP) | 0.400 | | | | |
| 14 | IR-filter | Plano | 0.300 | Glass | 1.517 | 64.2 | — |
| 15 | | Plano | 0.283 | | | | |
| 16 | Image | Plano | — | | | | |

Note:
Reference wavelength (d-line) is 587.6 nm.

TABLE 2

Aspheric Coefficients

| Surface # | | | | | |
|---|---|---|---|---|---|
| 2 | 3 | 4 | 5 | 6 | 7 |

| | 2 | 3 | 4 | 5 | 6 | 7 |
|---|---|---|---|---|---|---|
| k = | −5.95086E−01 | −1.00000E+00 | −3.40839E+00 | −1.00000E+00 | 3.00000E+00 | −1.00000E+00 |
| A4 = | 1.97780E−02 | 1.76094E−02 | −7.84598E−02 | −1.02280E−01 | −2.50966E−01 | −2.81093E−01 |
| A6 = | 2.66008E−02 | 7.02485E−02 | 1.62294E−01 | 1.94798E−01 | 1.31837E−01 | 1.76878E−01 |
| A8 = | −2.71006E−02 | −9.06988E−02 | −1.92185E−01 | −1.52184E−01 | −1.76368E−01 | −1.33764E−01 |
| A10 = | 3.03548E−02 | −7.03179E−02 | 8.50525E−02 | 4.04229E−02 | 1.55123E−01 | 7.46328E−02 |
| A12 = | −2.95379E−02 | 1.19766E−01 | −1.05664E−01 | 3.10189E−02 | −2.52004E−02 | −6.01139E−03 |
| A14 = | 5.20952E−03 | −4.98156E−02 | 8.44373E−02 | −5.02264E−04 | 2.49919E−04 | −5.36282E−03 |

TABLE 2-continued

Aspheric Coefficients

| Surface # | | | | | |
|---|---|---|---|---|---|
| 8 | 9 | 10 | 11 | 12 | 13 |
| k = −1.00000E+00 | −6.34430E−01 | 3.89386E−02 | −7.36101E−01 | −2.90176E+00 | −1.00000E+00 |
| A4 = −1.05883E−01 | −1.56333E−02 | −7.67629E−03 | 7.65900E−02 | 7.97879E−02 | 4.40046E−02 |
| A6 = 8.02386E−02 | 6.23103E−03 | −2.16990E−04 | −2.66978E−02 | −3.90276E−02 | −2.19589E−02 |
| A8 = 6.67582E−03 | −1.10583E−04 | 4.54114E−03 | 3.40343E−02 | 7.91676E−03 | 2.65336E−03 |
| A10 = −2.09288E−02 | 1.47629E−03 | 8.50047E−04 | −1.12146E−02 | −6.78177E−04 | 4.21335E−05 |
| A12 = 6.17892E−03 | 1.04199E−03 | 5.64722E−05 | 1.22347E−03 | 5.06513E−05 | −2.59321E−05 |
| A14 = −4.89160E−04 | | −2.29554E−05 | −1.63845E−05 | −4.30018E−06 | −2.13623E−06 |
| A16 = | | | | −6.98060E−08 | 5.26659E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

Figure 3:
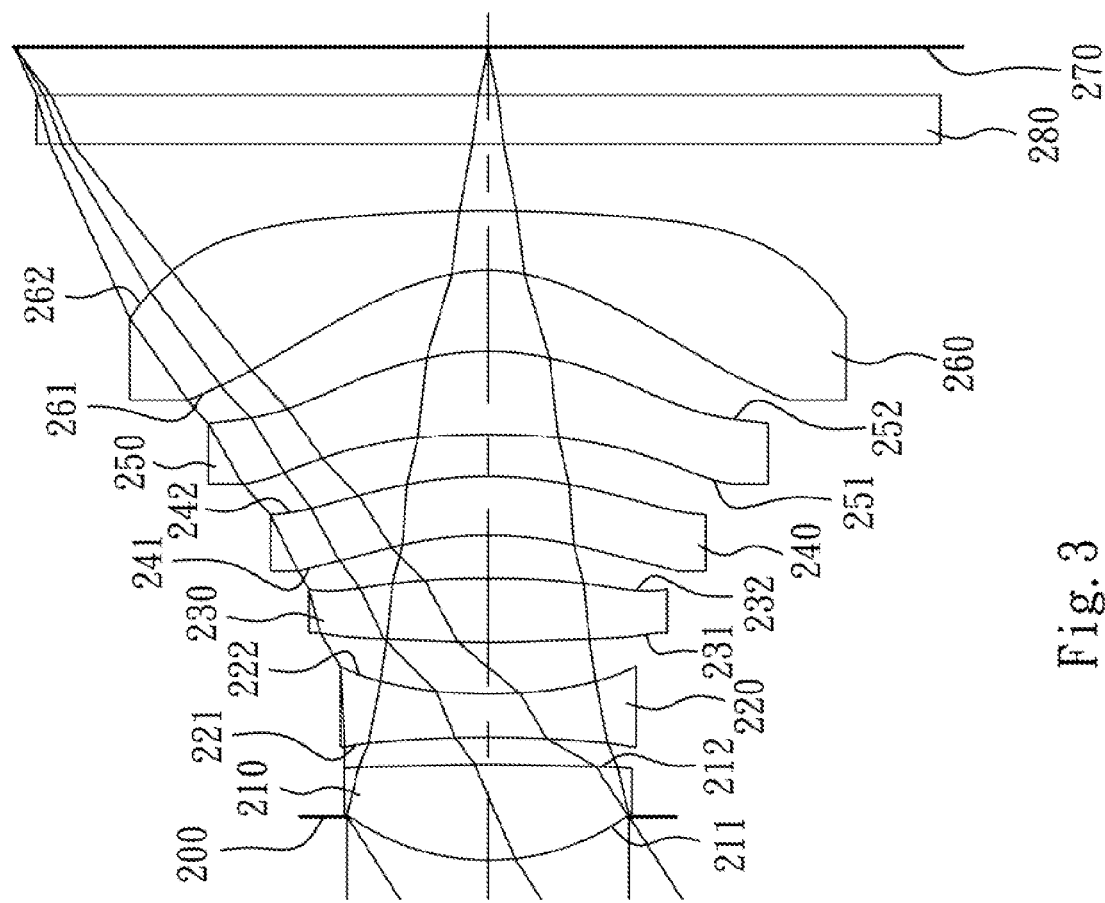
FIG. 3 is a schematic view of an optical image capturing lens assembly according to the second embodiment of the present disclosure.
Figure 4:
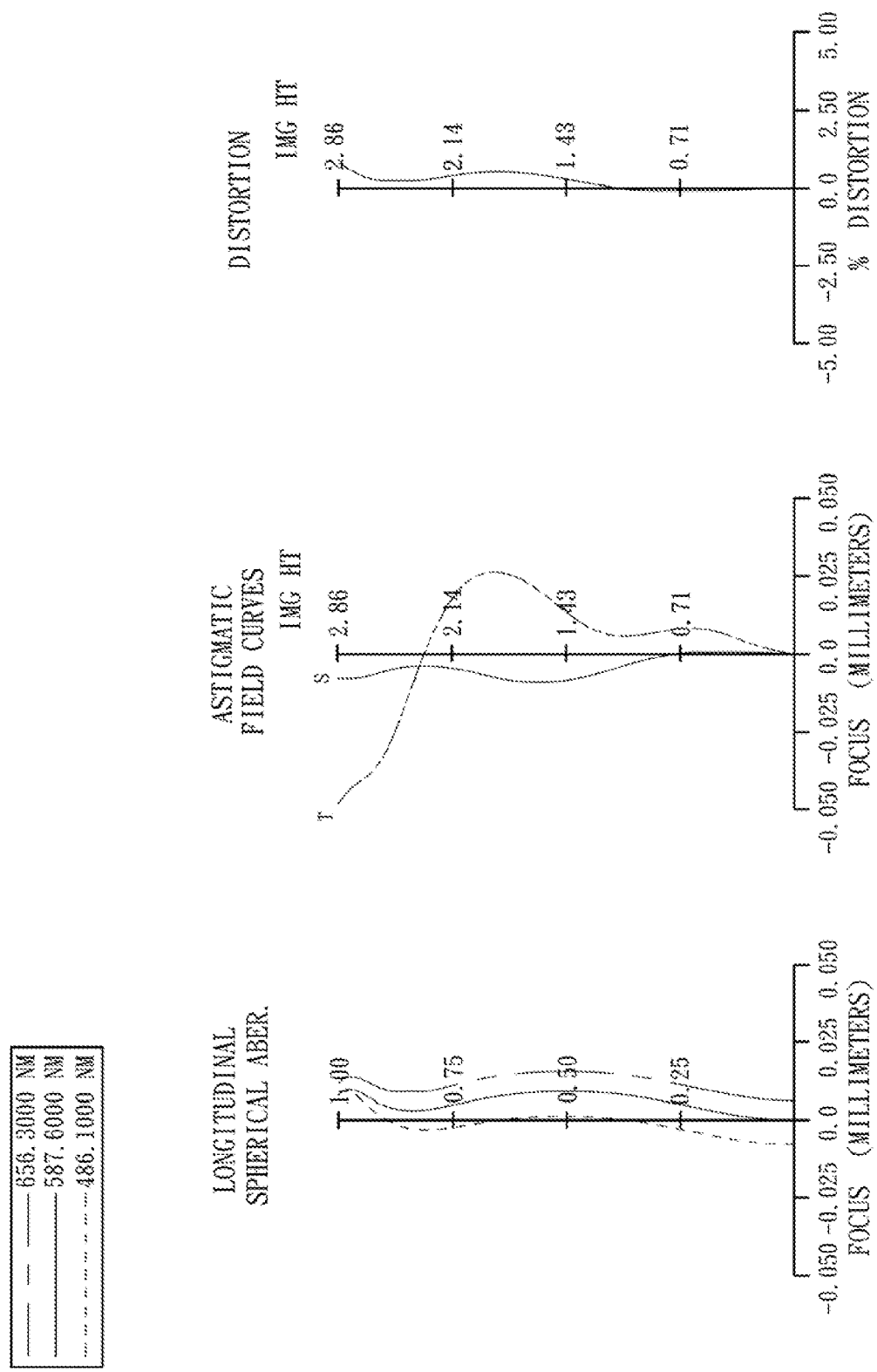
FIG. 4 shows spherical aberration curves, astigmatic field curves and a distortion curve of the optical image capturing lens assembly according to the second embodiment.

FIG. 3 is a schematic view of an optical image capturing lens assembly according to the second embodiment of the present disclosure. FIG. 4 shows spherical aberration curves, astigmatic field curves and a distortion curve of the optical image capturing lens assembly according to the second embodiment. In FIG. 3, the optical image capturing lens assembly includes, in order from an object side to an image side, an aperture stop 200, the first lens element 210, the second lens element 220, the third lens element 230, the fourth lens element 240, the fifth lens element 250, the sixth lens element 260, an IR cut filter 280 and an image plane 270.

The first lens element 210 is made of plastic material. The first lens element 210 with positive refractive power has a convex object-side surface 211 and a convex image-side surface 212. The object-side surface 211 and the image-side surface 212 of the first lens element 210 are aspheric.

The second lens element 220 is made of plastic material. The second lens element 220 with negative refractive power has a concave object-side surface 221 and a concave image-side surface 222. The object-side surface 221 and the image-side surface 222 of the second lens element 220 are aspheric.

The third lens element 230 is made of plastic material. The third lens element 230 with positive refractive power has a convex object-side surface 231 and a convex image-side surface 232. The object-side surface 231 and the image-side surface 232 of the third lens element 230 are aspheric. The third lens element 230 has inflection points formed on the image-side surface 232 thereof.

The fourth lens element 240 is made of plastic material. The fourth lens element 240 with positive refractive power has a concave object-side surface 241 and a convex image-side surface 242. The object-side surface 241 and the image-side surface 242 of the fourth lens element 240 are aspheric. The fourth lens element 240 has inflection points formed on the object-side surface 241 and the image-side surface 242 thereof.

The fifth lens element 250 is made of plastic material. The fifth lens element 250 with positive refractive power has a concave object-side surface 251 and a convex image-side surface 252. The object-side surface 251 and the image-side surface 252 of the fifth lens element 250 are aspheric. The fifth lens element 250 has inflection points formed on the object-side surface 251 and the image-side surface 252 thereof.

The sixth lens element 260 is made of plastic material. The sixth lens element 260 with negative refractive power has a concave object-side surface 261 and a convex image-side surface 262. The object-side surface 261 and the image-side surface 262 of the sixth lens element 260 are aspheric. The sixth lens element 260 has inflection points formed on the object-side surface 261 thereof.

The IR cut filter 280 is made of glass and located between the sixth lens element 260 and the image plane 270, and will not affect the focal length of the optical image capturing lens assembly.

The detailed optical data of the second embodiment are shown in Table 3 and the aspheric surface data are shown in Table 4 below.

TABLE 3

2nd Embodiment
f = 4.43 mm, Fno = 2.60, HFOV = 32.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.265 | | | | |
| 2 | Lens 1 | 1.490210 (ASP) | 0.577 | Plastic | 1.530 | 55.8 | 2.55 |
| 3 | | −12.436800 (ASP) | 0.164 | | | | |
| 4 | Lens 2 | −7.977300 (ASP) | 0.264 | Plastic | 1.634 | 23.8 | −3.10 |
| 5 | | 2.643620 (ASP) | 0.313 | | | | |
| 6 | Lens 3 | 5.555600 (ASP) | 0.385 | Plastic | 1.583 | 30.2 | 5.77 |
| 7 | | −8.333300 (ASP) | 0.264 | | | | |
| 8 | Lens 4 | −2.393140 (ASP) | 0.353 | Plastic | 1.544 | 55.9 | 102.02 |
| 9 | | −2.413490 (ASP) | 0.256 | | | | |

TABLE 3-continued

2nd Embodiment
f = 4.43 mm, Fno = 2.60, HFOV = 32.6 deg.

| Surface # | | Curvature Radius | Thickness | Material | Index | Abbe # | Focal length |
|---|---|---|---|---|---|---|---|
| 10 | Lens 5 | −4.496300 (ASP) | 0.500 | Plastic | 1.530 | 55.8 | 4.86 |
| 11 | | −1.700290 (ASP) | 0.490 | | | | |
| 12 | Lens 6 | −1.096720 (ASP) | 0.365 | Plastic | 1.530 | 55.8 | −2.47 |
| 13 | | −7.575800 (ASP) | 0.400 | | | | |
| 14 | IR-filter | Plano | 0.300 | Glass | 1.517 | 64.2 | — |
| 15 | | Plano | 0.289 | | | | |
| 16 | Image | Plano | — | | | | |

Note:
Reference wavelength (d-line) is 587.6 nm.

TABLE 4

Aspheric Coefficients

| | Surface # | | | | | |
|---|---|---|---|---|---|---|
| | 2 | 3 | 4 | 5 | 6 | 7 |
| k = | −4.76032E−01 | −1.00000E+00 | −5.91073E+00 | −1.00000E+00 | 2.57359E+00 | −1.00000E+00 |
| A4 = | 2.54298E−02 | 2.52926E−02 | −4.87798E−02 | −8.08942E−02 | −1.60529E−01 | −1.46270E−01 |
| A6 = | 1.53804E−02 | 1.54688E−02 | 1.86193E−01 | 2.53211E−01 | 1.82655E−01 | 1.83422E−01 |
| A8 = | −2.48347E−03 | 1.99049E−02 | −2.67350E−01 | −2.06546E−01 | −1.55708E−01 | −1.13756E−01 |
| A10 = | 2.90237E−02 | −1.22054E−01 | 1.31544E−01 | 3.88097E−02 | 1.58151E−01 | 8.20728E−02 |
| A12 = | −2.65496E−02 | 8.75860E−02 | −8.52223E−02 | 4.08564E−02 | −5.94267E−02 | −1.28951E−02 |
| A14 = | −7.30649E−04 | −3.86728E−02 | 4.62734E−02 | 1.13271E−02 | −5.56091E−03 | −7.52201E−03 |

| | Surface # | | | | | |
|---|---|---|---|---|---|---|
| | 8 | 9 | 10 | 11 | 12 | 13 |
| k = | −1.00000E+00 | −2.61686E+00 | 2.18581E+00 | −5.89386E−01 | −1.84217E+00 | −1.00000E+00 |
| A4 = | −5.32578E−02 | 3.58071E−03 | −2.65470E−02 | 3.96020E−02 | 6.51573E−02 | 3.27860E−02 |
| A6 = | 1.20477E−01 | 2.01348E−02 | −1.23894E−02 | −1.57285E−02 | −3.25092E−02 | −2.03748E−02 |
| A8 = | −1.15296E−02 | −5.50689E−03 | 8.28562E−03 | 3.14502E−02 | 8.75740E−03 | 2.94990E−03 |
| A10 = | −3.54851E−02 | 3.77441E−04 | 1.39913E−03 | −1.16594E−02 | −6.48225E−04 | −6.37162E−06 |
| A12 = | 5.98271E−03 | 8.26150E−04 | 2.67068E−05 | 1.20620E−03 | 3.90634E−05 | −4.25862E−05 |
| A14 = | 2.41084E−03 | | −1.62008E−04 | 1.94351E−05 | −1.17214E−05 | −2.83942E−06 |
| A16 = | | | | | −2.85019E−06 | 9.28940E−07 |

In the optical image capturing lens assembly according to the second embodiment, the definitions of f, Fno, HFOV, V1, V2, T12, T23, ΣCT, CT6, TD, R1, R2, R3, R4, R11, f1, f345, SD, SAG11, TTL and ImgH are the same as those stated in the first embodiment with corresponding values for the second embodiment. Moreover, these parameters can be calculated from Tables 3 and 4 as the following values and satisfy the following relationships:

| | |
|---|---|
| f(mm) | 4.43 |
| Fno | 2.60 |
| HFOV(deg.) | 32.6 |
| V1 − V2 | 32.0 |
| T12/T23 | 0.52 |
| ΣCT/TD | 0.62 |
| (R1 + R2)/(R1 − R2) | −0.79 |
| (R3 + R4)/(R3 − R4) | 0.50 |
| R11/f | −0.25 |
| f/f1 | 1.74 |
| f/f345 | 1.50 |
| SD/TD | 0.93 |
| SAG11/CT6 | −2.14 |
| ImgH/f | 0.64 |
| TTL/ImgH | 1.69 |

Figure 5:
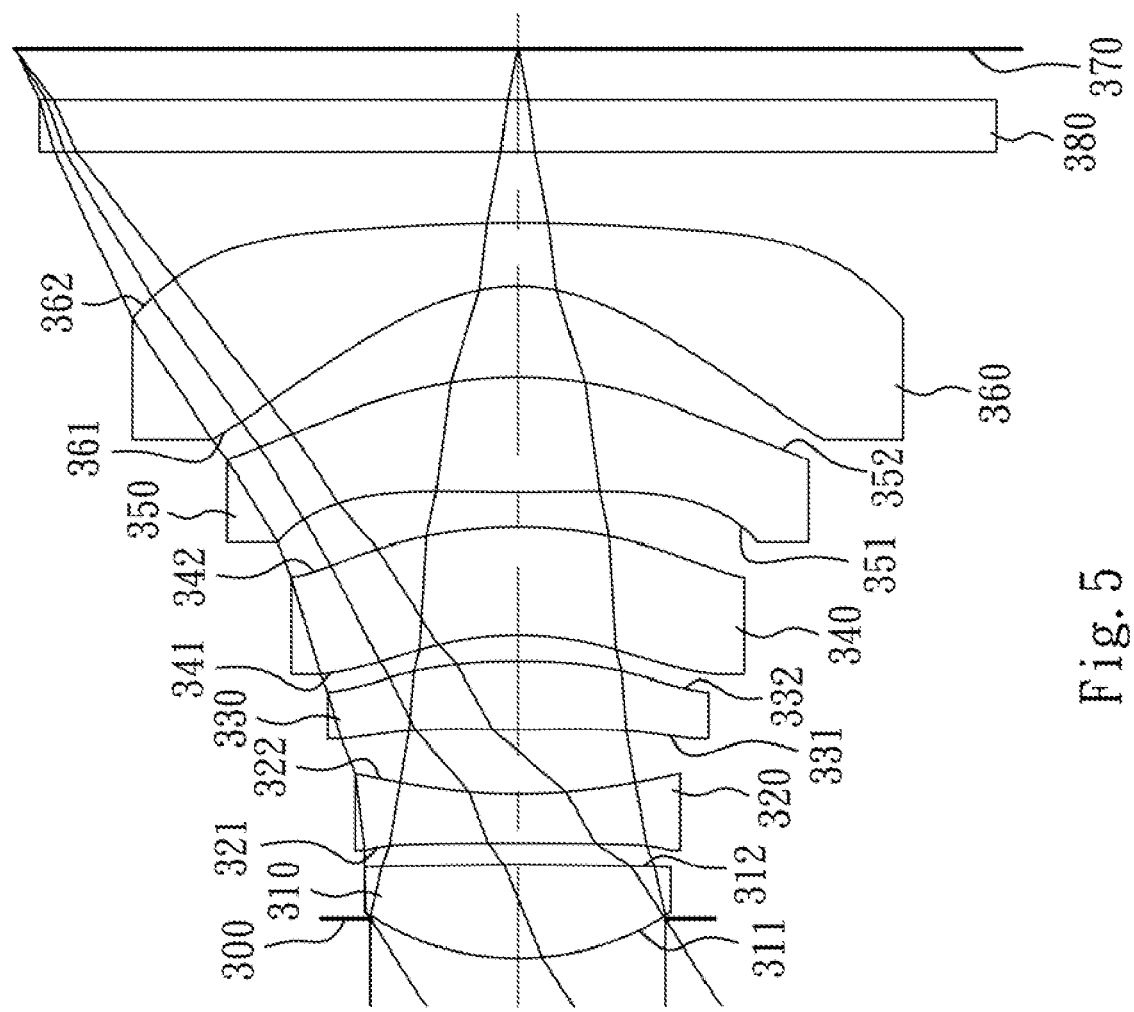
FIG. 5 is a schematic view of an optical image capturing lens assembly according to the third embodiment of the present disclosure.
Figure 6:
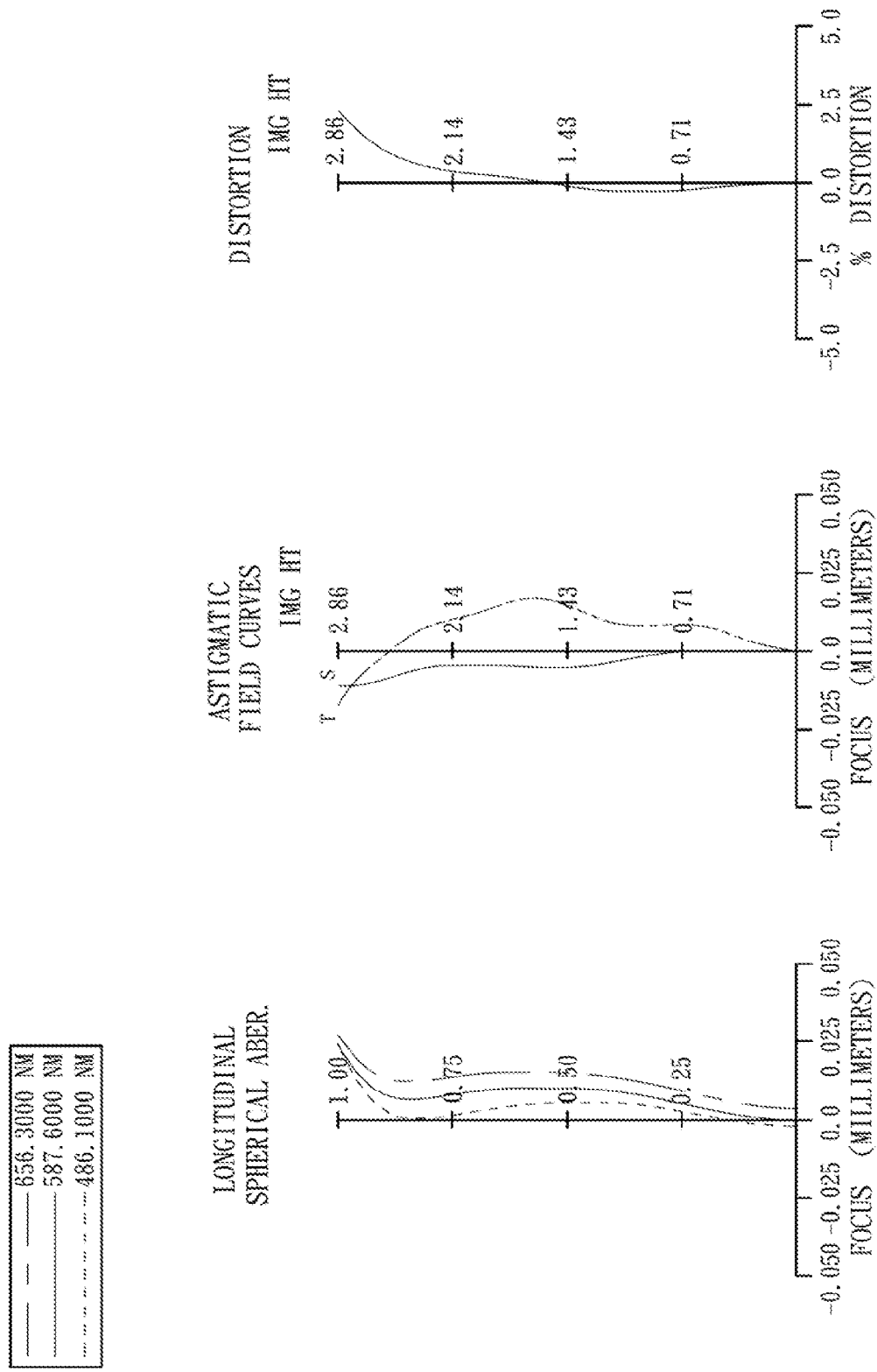
FIG. 6 shows spherical aberration curves, astigmatic field curves and a distortion curve of the optical image capturing lens assembly according to the third embodiment.

FIG. 5 is a schematic view of an optical image capturing lens assembly according to the third embodiment of the present disclosure. FIG. 6 shows spherical aberration curves, astigmatic field curves and a distortion curve of the optical image capturing lens assembly according to the third embodiment. In FIG. 5, the optical image capturing lens assembly includes, in order from an object side to an image side, an aperture stop 300, the first lens element 310, the second lens element 320, the third lens element 330, the fourth lens element 340, the fifth lens element 350, the sixth lens element 360, an IR cut filter 380 and an image plane 370.

The first lens element 310 is made of plastic material. The first lens element 310 with positive refractive power has a convex object-side surface 311 and a convex image-side surface 312. The object-side surface 311 and the image-side surface 312 of the first lens element 310 are aspheric.

The second lens element 320 is made of plastic material. The second lens element 320 with negative refractive power has a concave object-side surface 321 and a concave image-side surface 322. The object-side surface 321 and the image-side surface 322 of the second lens element 320 are aspheric.

The third lens element 330 is made of plastic material. The third lens element 330 with positive refractive power has a convex object-side surface 331 and a convex image-side surface 332. The object-side surface 331 and the image-side surface 332 of the third lens element 330 are aspheric. The third lens element 330 has inflection points formed on the image-side surface 332 thereof.

The fourth lens element 340 is made of plastic material. The fourth lens element 340 with negative refractive power has a concave object-side surface 341 and a convex image-side surface 342. The object-side surface 341 and the image-side surface 342 of the fourth lens element 340 are aspheric. The fourth lens element 340 has inflection points formed on the object-side surface 341 thereof.

The fifth lens element 350 is made of plastic material. The fifth lens element 350 with positive refractive power has a convex object-side surface 351 and a convex image-side surface 352. The object-side surface 351 and the image-side surface 352 of the fifth lens element 350 are aspheric. The fifth lens element 350 has inflection points formed on the object-side surface 351 thereof.

The sixth lens element 360 is made of plastic material. The sixth lens element 360 with negative refractive power has a concave object-side surface 361 and a convex image-side surface 362. The object-side surface 361 and the image-side surface 362 of the sixth lens element 360 are aspheric. The sixth lens element 360 has inflection points formed on the object-side surface 361 thereof.

The IR cut filter 380 is made of glass and located between the sixth lens element 360 and the image plane 370, and will not affect the focal length of the optical image capturing lens assembly.

The detailed optical data of the third embodiment are shown in Table 5 and the aspheric surface data are shown in Table 6 below.

TABLE 5

3rd Embodiment
f = 4.36 mm, Fno = 2.60, HFOV = 32.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.220 | | | | |
| 2 | Lens 1 | 1.683250 (ASP) | 0.531 | Plastic | 1.530 | 55.8 | 2.79 |
| 3 | | −10.792800 (ASP) | 0.122 | | | | |
| 4 | Lens 2 | −83.450000 (ASP) | 0.277 | Plastic | 1.633 | 23.4 | −4.39 |
| 5 | | 2.878170 (ASP) | 0.368 | | | | |
| 6 | Lens 3 | 12.864800 (ASP) | 0.387 | Plastic | 1.544 | 55.9 | 6.07 |
| 7 | | −4.398500 (ASP) | 0.150 | | | | |
| 8 | Lens 4 | −1.861400 (ASP) | 0.615 | Plastic | 1.544 | 55.9 | −14.57 |
| 9 | | −2.715700 (ASP) | 0.200 | | | | |
| 10 | Lens 5 | 13.029800 (ASP) | 0.653 | Plastic | 1.530 | 55.8 | 3.87 |
| 11 | | −2.389790 (ASP) | 0.519 | | | | |
| 12 | Lens 6 | −1.043310 (ASP) | 0.365 | Plastic | 1.530 | 55.8 | −2.33 |
| 13 | | −7.575800 (ASP) | 0.400 | | | | |
| 14 | IR-filter | Plano | 0.300 | Glass | 1.517 | 64.2 | — |
| 15 | | Plano | 0.285 | | | | |
| 16 | Image | Plano | — | | | | |

Note:
Reference wavelength (d-line) is 587.6 nm.

TABLE 6

Aspheric Coefficients

| | Surface # | | | | | |
|---|---|---|---|---|---|---|
| | 2 | 3 | 4 | 5 | 6 | 7 |
| k = | −4.33527E−01 | −1.00000E+00 | 3.00000E+00 | −1.00000E+00 | −1.00000E+01 | −1.00000E+00 |
| A4 = | 2.59284E−02 | 4.03963E−02 | −6.77533E−02 | −1.14494E−01 | −1.79634E−01 | −1.88008E−01 |
| A6 = | 1.84952E−02 | 4.14713E−02 | 1.82603E−01 | 2.12966E−01 | 1.39415E−01 | 1.84624E−01 |
| A8 = | 1.36766E−02 | 8.73215E−03 | −2.59002E−01 | −2.08494E−01 | −1.67590E−01 | −9.65563E−02 |
| A10 = | 1.30917E−02 | −1.44538E−01 | 6.84602E−02 | 2.71409E−02 | 1.79730E−01 | 7.85818E−02 |
| A12 = | −1.03363E−02 | 8.75860E−02 | −8.52223E−02 | 4.08564E−02 | −5.59806E−02 | −1.91621E−02 |
| A14 = | −7.30638E−04 | −3.86728E−02 | 4.62734E−02 | 1.13271E−02 | −5.56092E−03 | −6.75407E−03 |

| | Surface # | | | | | |
|---|---|---|---|---|---|---|
| | 8 | 9 | 10 | 11 | 12 | 13 |
| k = | −1.00000E+00 | −1.38639E−01 | −1.00000E+01 | −1.19341E−01 | −1.43339E+00 | −1.00000E+00 |
| A4 = | −2.99867E−02 | −1.88285E−02 | −9.14727E−02 | 1.14292E−02 | 7.82121E−02 | 4.11036E−02 |
| A6 = | 1.24630E−01 | 1.80976E−02 | −1.11953E−02 | −2.17075E−02 | −3.16622E−02 | −2.16359E−02 |
| A8 = | −1.08373E−02 | −5.13454E−03 | 9.25478E−03 | 3.08022E−02 | 7.84999E−03 | 3.03252E−03 |
| A10 = | −2.73731E−02 | 1.42508E−03 | −7.82028E−03 | −1.14380E−02 | −9.08844E−03 | 8.34157E−06 |
| A12 = | 1.13402E−02 | 1.31398E−03 | −7.83321E−04 | 1.27981E−03 | 1.28409E−05 | −4.09741E−05 |
| A14 = | −3.20531E−03 | | −3.51213E−04 | 2.57647E−05 | −3.82158E−06 | −2.44030E−06 |
| A16 = | | | | | 4.08812E−06 | 8.08854E−07 |

In the optical image capturing lens assembly according to the third embodiment, the definitions of f, Fno, HFOV, V1, V2, T12, T23, ΣCT, CT6, TD, R1, R2, R3, R4, R11, f1, f345, SD, SAG11, TTL and ImgH are the same as those stated in the first embodiment with corresponding values for the third embodiment. Moreover, these parameters can be calculated from Tables 5 and 6 as the following values and satisfy the following relationships:

| | |
|---|---|
| f(mm) | 4.36 |
| Fno | 2.60 |
| HFOV(deg.) | 32.6 |
| V1 − V2 | 32.4 |
| T12/T23 | 0.33 |
| ΣCT/TD | 0.68 |
| (R1 + R2)/(R1 − R2) | −0.73 |
| (R3 + R4)/(R3 − R4) | 0.93 |
| R11/f | −0.24 |
| f/f1 | 1.56 |
| f/f345 | 1.46 |
| SD/TD | 0.95 |
| SAG11/CT6 | −2.39 |
| ImgH/f | 0.65 |
| TTL/ImgH | 1.78 |

Figure 7:
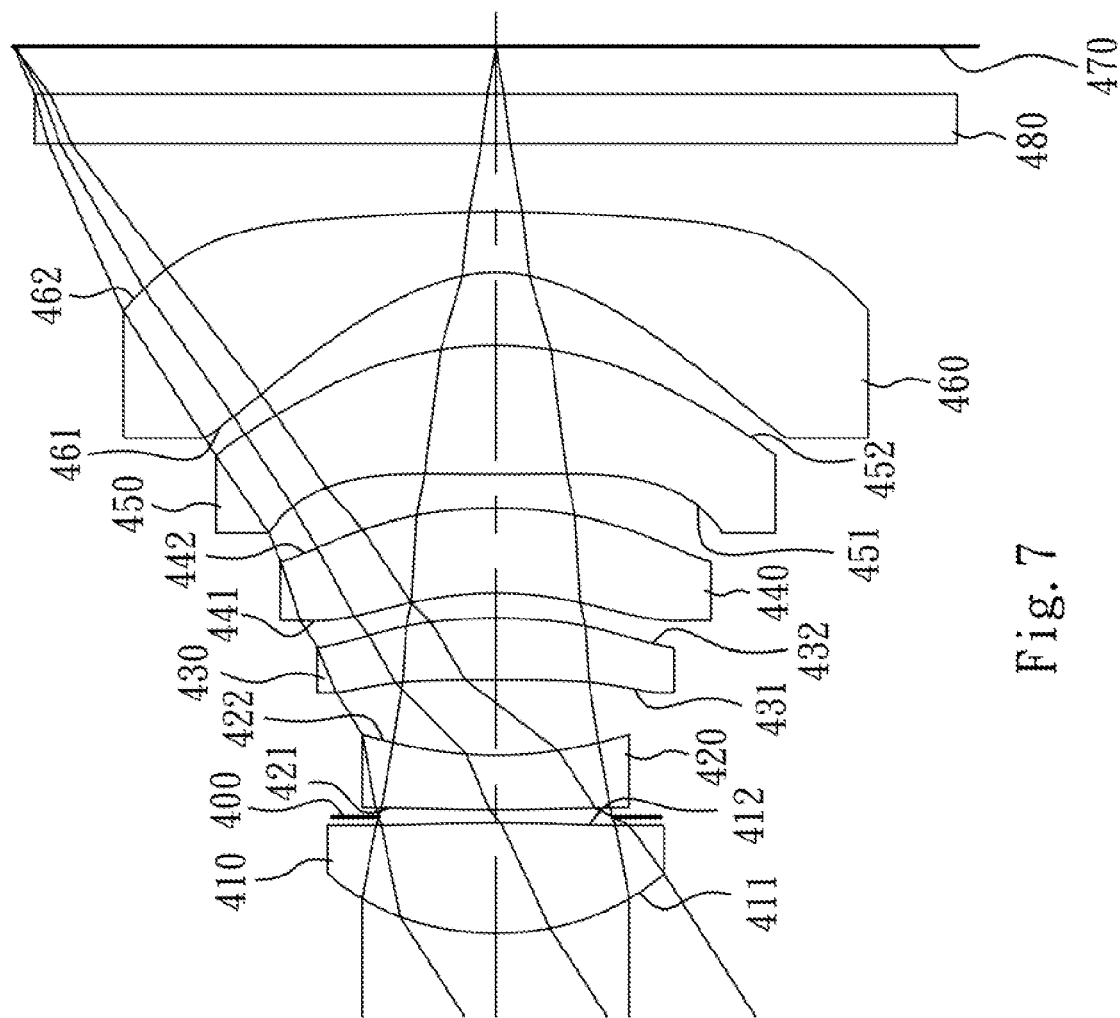
FIG. 7 is a schematic view of an optical image capturing lens assembly according to the fourth embodiment of the present disclosure.
Figure 8:
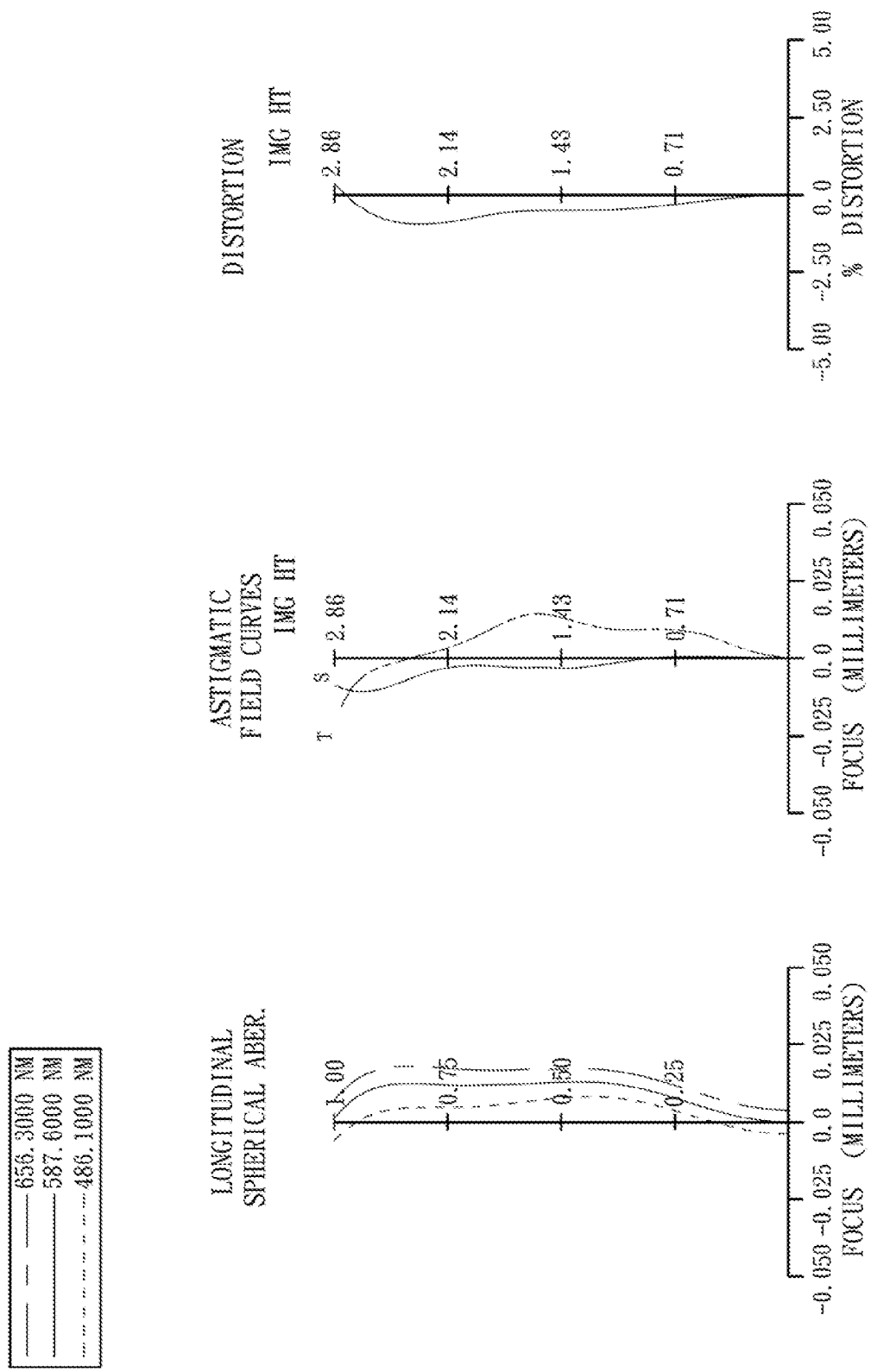
FIG. 8 shows spherical aberration curves, astigmatic field curves and a distortion curve of the optical image capturing lens assembly according to the fourth embodiment.

FIG. 7 is a schematic view of an optical image capturing lens assembly according to the fourth embodiment of the present disclosure. FIG. 8 shows spherical aberration curves, astigmatic field curves and a distortion curve of the optical image capturing lens assembly according to the fourth embodiment. In FIG. 7, the optical image capturing lens assembly includes, in order from an object side to an image side, the first lens element 410, an aperture stop 400, the second lens element 420, the third lens element 430, the fourth lens element 440, the fifth lens element 450, the sixth lens element 460, an IR cut to filter 480 and an image plane 470.

The first lens element 410 is made of plastic material. The first lens element 410 with positive refractive power has a convex object-side surface 411 and a convex image-side surface 412. The object-side surface 411 and the image-side surface 412 of the first lens element 410 are aspheric.

The second lens element 420 is made of plastic material. The second lens element 420 with negative refractive power has a convex object-side surface 421 and a concave image-side surface 422. The object-side surface 421 and the image-side surface 422 of the second lens element 420 are aspheric.

The third lens element 430 is made of plastic material. The third lens element 430 with positive refractive power has a concave object-side surface 431 and a convex image-side surface 432. The object-side surface 431 and the image-side surface 432 of the third lens element 430 are aspheric. The third lens element 430 has inflection points formed on the image-side surface 432 thereof.

The fourth lens element 440 is made of plastic material. The fourth lens element 440 with negative refractive power has a concave object-side surface 441 and a convex image-side surface 442. The object-side surface 441 and the image-side surface 442 of the fourth lens element 440 are aspheric. The fourth lens element 440 has inflection points formed on the object-side surface 441 thereof.

The fifth lens element 450 is made of plastic material. The fifth lens element 450 with positive refractive power has a convex object-side surface 451 and a convex image-side surface 452. The object-side surface 451 and the image-side surface 452 of the fifth lens element 450 are aspheric. The fifth lens element 450 has inflection points formed on the object-side surface 451 thereof.

The sixth lens element 460 is made of plastic material. The sixth lens element 460 with negative refractive power has a concave object-side surface 461 and a convex image-side surface 462. The object-side surface 461 and the image-side surface 462 of the sixth lens element 460 are aspheric. The sixth lens element 460 has inflection points formed on the object-side surface 461 thereof.

The IR cut filter 480 is made of glass and located between the sixth lens element 460 and the image plane 470, and will not affect the focal length of the optical image capturing lens assembly.

The detailed optical data of the fourth embodiment are shown in Table 7 and the aspheric surface data are shown in Table 8 below.

TABLE 7

4th Embodiment
f = 4.44 mm, Fno = 2.80, HFOV = 32.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.715060 (ASP) | 0.656 | Plastic | 1.514 | 56.8 | 2.88 |
| 2 | | −9.430900 (ASP) | 0.035 | | | | |
| 3 | Ape. Stop | Plano | 0.043 | | | | |
| 4 | Lens 2 | 10.489500 (ASP) | 0.321 | Plastic | 1.633 | 23.4 | −4.51 |
| 5 | | 2.215160 (ASP) | 0.451 | | | | |
| 6 | Lens 3 | −641.203300 (ASP) | 0.363 | Plastic | 1.544 | 55.9 | 7.60 |
| 7 | | −4.109400 (ASP) | 0.150 | | | | |
| 8 | Lens 4 | −2.212870 (ASP) | 0.506 | Plastic | 1.544 | 55.9 | −33.43 |
| 9 | | −2.722340 (ASP) | 0.200 | | | | |
| 10 | Lens 5 | 15.059400 (ASP) | 0.766 | Plastic | 1.530 | 55.8 | 3.60 |
| 11 | | −2.149160 (ASP) | 0.435 | | | | |
| 12 | Lens 6 | −0.981670 (ASP) | 0.365 | Plastic | 1.530 | 55.8 | −2.17 |
| 13 | | −7.575800 (ASP) | 0.400 | | | | |
| 14 | IR-filter | Plano | 0.300 | Glass | 1.517 | 64.2 | — |
| 15 | | Plano | 0.281 | | | | |
| 16 | Image | Plano | — | | | | |

Note:
Reference wavelength (d-line) is 587.6 nm.

TABLE 8

Aspheric Coefficients

| Surface # | | | | | |
|---|---|---|---|---|---|
| 1 | 2 | 4 | 5 | 6 | 7 |
| k = −5.29177E−01 | −1.00000E+00 | −8.16970E−02 | −1.00000E+00 | −1.00000E+01 | −1.00000E+00 |
| A4 = 2.26131E−02 | 3.63225E−02 | −8.57574E−02 | −1.13003E−01 | −1.65287E−01 | −1.80098E−01 |
| A6 = 1.88264E−02 | 4.58939E−02 | 1.86926E−01 | 1.81183E−01 | 1.19356E−01 | 1.79682E−01 |
| A8 = −1.60461E−02 | −2.92106E−02 | −2.77492E−01 | −1.75379E−01 | −1.77131E−01 | −9.56747E−02 |
| A10 = 3.58747E−02 | −6.76960E−02 | 1.69611E−01 | 4.55089E−02 | 2.01342E−01 | 7.72340E−02 |
| A12 = −1.35243E−02 | 8.75860E−02 | −8.52223E−02 | 4.08564E−02 | −5.28660E−02 | −1.77795E−02 |
| A14 = −7.30639E−04 | −3.86728E−02 | 4.62734E−02 | 1.13271E−02 | −5.56092E−03 | −6.57246E−03 |

| Surface # | | | | | |
|---|---|---|---|---|---|
| 8 | 9 | 10 | 11 | 12 | 13 |
| k = −1.00000E+00 | 6.32085E−01 | 3.00000E+00 | −3.77136E−02 | −1.33738E+00 | −1.00000E+00 |
| A4 = −2.81256E−02 | −2.74873E−02 | −1.04061E−01 | 2.62776E−03 | 7.63278E−02 | 4.16232E−02 |
| A6 = 1.23185E−01 | 1.75077E−02 | −1.23486E−02 | −2.15688E−02 | −3.16921E−02 | −2.23303E−02 |
| A8 = −1.36554E−02 | −5.40558E−03 | 8.58902E−03 | 3.08484E−02 | 7.76751E−03 | 3.05070E−03 |
| A10 = −2.76025E−02 | 1.61153E−03 | −4.92564E−04 | −1.13353E−02 | −9.50052E−04 | 1.15034E−05 |
| A12 = 1.36927E−02 | 1.98238E−03 | −6.22895E−04 | 1.28370E−03 | 1.43266E−05 | −3.92975E−05 |
| A14 = −2.73843E−03 | | −7.52283E−04 | 1.26649E−05 | −1.07123E−06 | −2.07318E−06 |
| A16 = | | | | 4.85116E−06 | 7.56992E−07 |

In the optical image capturing lens assembly according to the fourth embodiment, the definitions of f, Fno, HFOV, V1, V2, T12, T23, ΣCT, CT6, TD, R1, R2, R3, R4, R11, f1, f345, SD, SAG11, TTL and ImgH are the same as those stated in the first embodiment with corresponding values for the fourth embodiment. Moreover, these parameters can be calculated from Tables 7 and 8 as the following values and satisfy the following relationships:

| | |
|---|---|
| f(mm) | 4.44 |
| Fno | 2.80 |
| HFOV(deg.) | 32.6 |
| V1 − V2 | 33.4 |
| T12/T23 | 0.17 |
| ΣCT/TD | 0.69 |
| (R1 + R2)/(R1 − R2) | −0.69 |
| (R3 + R4)/(R3 − R4) | 1.54 |
| R11/f | −0.22 |
| f/f1 | 1.54 |
| f/f345 | 1.59 |
| SD/TD | 0.84 |
| SAG11/CT6 | −2.70 |
| ImgH/f | 0.64 |
| TTL/ImgH | 1.81 |

Figure 9:
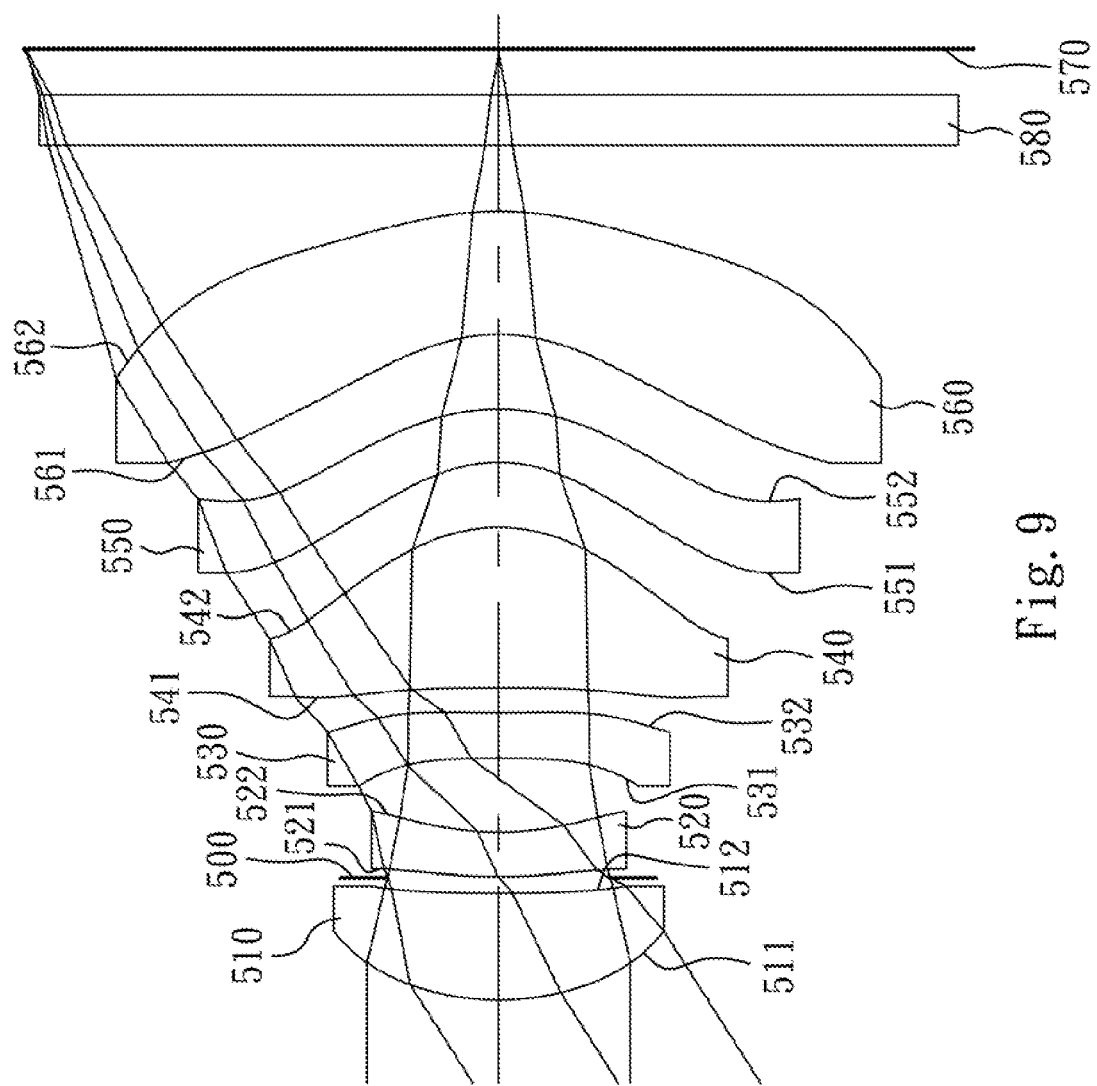
FIG. 9 is a schematic view of an optical image capturing lens assembly according to the fifth embodiment of the present disclosure.
Figure 10:
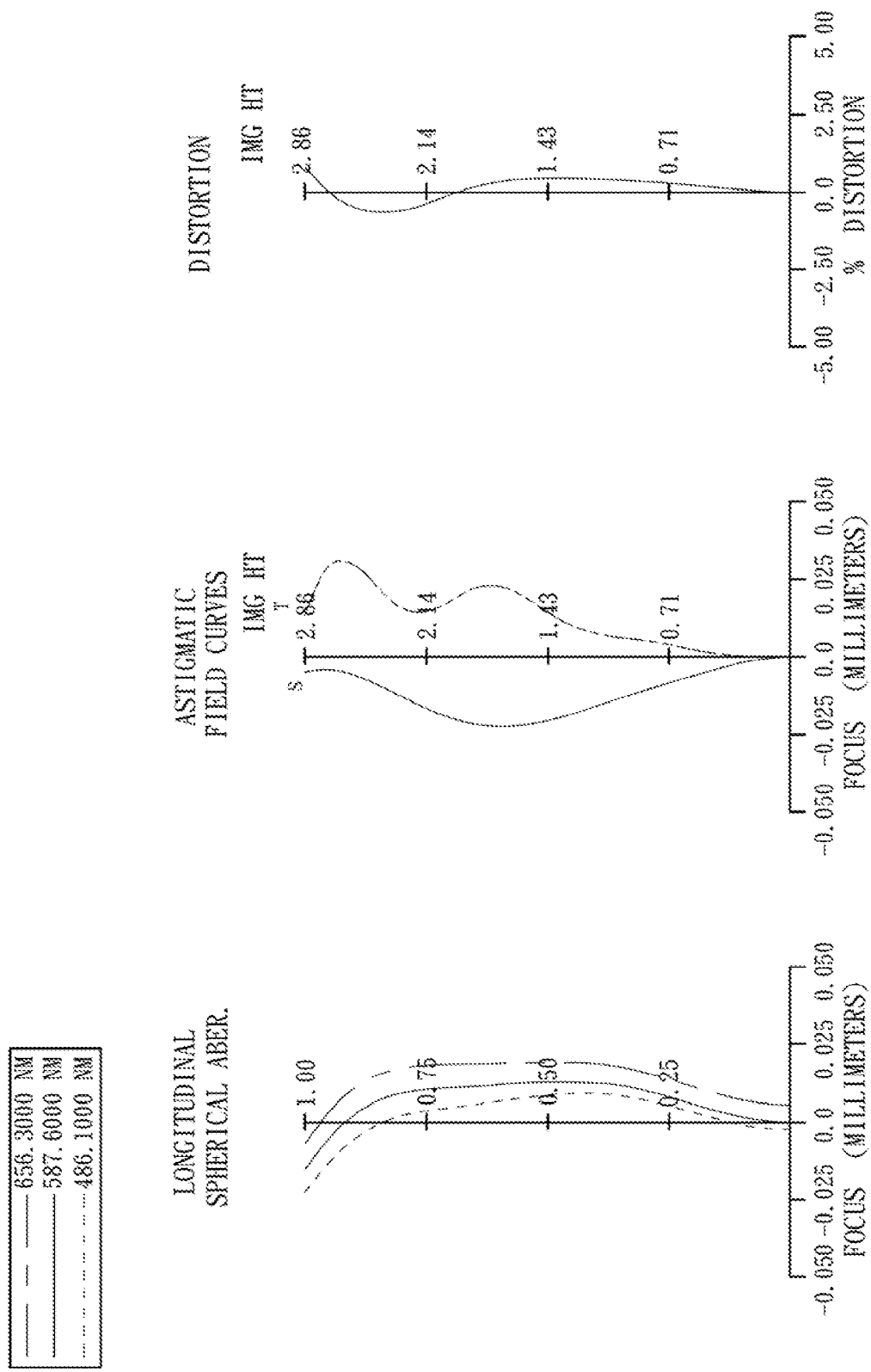
FIG. 10 shows spherical aberration curves, astigmatic field curves and a distortion curve of the optical image capturing lens assembly according to the fifth embodiment.

FIG. 9 is a schematic view of an optical image capturing lens assembly according to the fifth embodiment of the present disclosure. FIG. 10 shows spherical aberration curves, astigmatic field curves and a distortion curve of the optical image capturing lens assembly according to the fifth embodiment. In FIG. 9, the optical image capturing lens assembly includes, in order from an object side to an image side, the first lens element 510, an aperture stop 500, the second lens element 520, the third lens element 530, the fourth lens element 540, the fifth lens element 550, the sixth lens element 560, an IR cut filter 580 and an image plane 570.

The first lens element 510 is made of plastic material. The first lens element 510 with positive refractive power has a convex object-side surface 511 and a concave image-side surface 512. The object-side surface 511 and the image-side surface 512 of the first lens element 510 are aspheric.

The second lens element 520 is made of plastic material. The second lens element 520 with negative refractive power has a convex object-side surface 521 and a concave image-side surface 522. The object-side surface 521 and the image-side surface 522 of the second lens element 520 are aspheric.

The third lens element 530 is made of plastic material. The third lens element 530 with negative refractive power has a concave object-side surface 531 and a concave image-side surface 532. The object-side surface 531 and the image-side surface 532 of the third lens element 530 are aspheric. The third lens element 530 has inflection points formed on the image-side surface 532 thereof.

The fourth lens element 540 is made of plastic material. The fourth lens element 540 with positive refractive power has a concave object-side surface 541 and a convex image-side surface 542. The object-side surface 541 and the image-side surface 542 of the fourth lens element 540 are aspheric.

The fifth lens element 550 is made of plastic material. The fifth lens element 550 with negative refractive power has a concave object-side surface 551 and a convex image-side surface 552. The object-side surface 551 and the image-side surface 552 of the fifth lens element 550 are aspheric. The fifth lens element 550 has inflection points formed on the object-side surface 451 and the image-side surface 452 thereof.

The sixth lens element 560 is made of plastic material. The sixth lens element 560 with negative refractive power has a concave object-side surface 561 and a convex image-side surface 562. The object-side surface 561 and the image-side surface 562 of the sixth lens element 560 are aspheric. The sixth lens element 560 has inflection points formed on the object-side surface 561 thereof.

The IR cut filter 580 is made of glass and located between the sixth lens element 560 and the image plane 570, and will not affect the focal length of the optical image capturing lens assembly.

The detailed optical data of the fifth embodiment are shown in Table 9 and the aspheric surface data are shown in Table 10 below.

TABLE 9

5th Embodiment
f = 4.44 mm, Fno = 2.80, HFOV = 32.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.640170 (ASP) | 0.646 | Plastic | 1.543 | 56.5 | 3.29 |
| 2 | | 17.241400 (ASP) | 0.093 | | | | |
| 3 | Ape. Stop | Plano | 0.007 | | | | |
| 4 | Lens 2 | 3.720100 (ASP) | 0.264 | Plastic | 1.607 | 26.6 | −5.68 |
| 5 | | 1.742210 (ASP) | 0.450 | | | | |
| 6 | Lens 3 | −9.793700 (ASP) | 0.270 | Plastic | 1.650 | 21.4 | −7.05 |
| 7 | | 8.687800 (ASP) | 0.150 | | | | |
| 8 | Lens 4 | −23.901200 (ASP) | 0.971 | Plastic | 1.535 | 56.3 | 1.81 |
| 9 | | −0.941070 (ASP) | 0.388 | | | | |
| 10 | Lens 5 | −0.860020 (ASP) | 0.320 | Plastic | 1.543 | 56.5 | −7.21 |
| 11 | | −1.246480 (ASP) | 0.450 | | | | |
| 12 | Lens 6 | −1.078740 (ASP) | 0.741 | Plastic | 1.543 | 56.5 | −6.35 |
| 13 | | −1.948980 (ASP) | 0.400 | | | | |
| 14 | IR-filter | Plano | 0.300 | Glass | 1.517 | 64.2 | — |
| 15 | | Plano | 0.283 | | | | |
| 16 | Image | Plano | — | | | | |

Note:
Reference wavelength (d-line) is 587.6 nm.

TABLE 10

Aspheric Coefficients

| Surface # | 1 | 2 | 4 | 5 | 6 | 7 |
|---|---|---|---|---|---|---|
| k = | −2.30954E−01 | −1.00000E+00 | −6.70753E+00 | −1.00000E+00 | −1.00036E+01 | −1.00000E+00 |
| A4 = | 3.23350E−02 | 6.95712E−02 | −7.10336E−02 | −1.19385E−01 | −3.10279E−01 | −3.01676E−01 |
| A6 = | 3.50068E−02 | 1.67078E−02 | 1.06475E−01 | 1.15354E−01 | 1.11952E−01 | 1.86846E−01 |
| A8 = | −2.81403E−02 | 5.89364E−02 | −2.61687E−01 | −1.97764E−01 | −1.22369E−01 | −1.27716E−01 |
| A10 = | 8.90638E−02 | −1.95807E−01 | 4.59980E−02 | −1.45757E−02 | 9.10576E−02 | 7.94166E−02 |
| A12 = | −6.91502E−02 | 1.31186E−01 | −1.25981E−01 | 1.52088E−02 | −1.53279E−02 | −4.12198E−04 |
| A14 = | 3.26572E−02 | −4.96493E−02 | 8.44370E−02 | −2.31998E−03 | −9.49352E−03 | −4.15937E−03 |

| Surface # | 8 | 9 | 10 | 11 | 12 | 13 |
|---|---|---|---|---|---|---|
| k = | −1.00000E+00 | −1.59812E+00 | −2.18540E+00 | −7.20033E−01 | −1.20377E+00 | −1.00000E+00 |
| A4 = | −1.12349E−01 | −3.23630E−03 | 1.91544E−02 | 8.83555E−02 | 1.26813E−01 | 9.49890E−02 |
| A6 = | 8.28900E−02 | 3.23587E−03 | 5.75434E−03 | −3.46715E−02 | −3.89842E−02 | −2.80884E−02 |
| A8 = | 8.60958E−03 | 5.68423E−03 | 9.08754E−04 | 3.53721E−02 | 7.54402E−03 | 2.64569E−03 |
| A10 = | −1.95831E−02 | 1.70748E−03 | 1.58522E−05 | −1.09864E−02 | −7.06660E−04 | 7.16676E−05 |
| A12 = | 6.25457E−03 | 1.44754E−04 | −5.50743E−05 | 1.19917E−03 | 4.41280E−05 | −1.88415E−05 |
| A14 = | −8.81206E−04 | | | −1.82235E−05 | −5.20619E−06 | −2.78399E−06 |
| A16 = | | | | | −6.40010E−08 | 3.67008E−07 |

In the optical image capturing lens assembly according to the fifth embodiment, the definitions of f, Fno, HFOV, V1, V2, T12, T23, ΣCT, CT6, TD, R1, R2, R3, R4, R11, f1, f345, SD, SAG11, TTL and ImgH are the same as those stated in the first embodiment with corresponding values for the fifth embodiment. Moreover, these parameters can be calculated from Tables 9 and 10 as the following values and satisfy the following relationships:

| | |
|---|---|
| f(mm) | 4.44 |
| Fno | 2.80 |
| HFOV(deg.) | 32.5 |
| V1 − V2 | 29.9 |
| T12/T23 | 0.22 |
| ΣCT/TD | 0.68 |
| (R1 + R2)/(R1 − R2) | −1.21 |
| (R3 + R4)/(R3 − R4) | 2.76 |
| R11/f | −0.24 |
| f/f1 | 1.35 |
| f/f345 | 1.35 |
| SD/TD | 0.84 |
| SAG11/CT6 | −1.04 |
| ImgH/f | 0.64 |
| TTL/ImgH | 1.97 |

Figure 11:
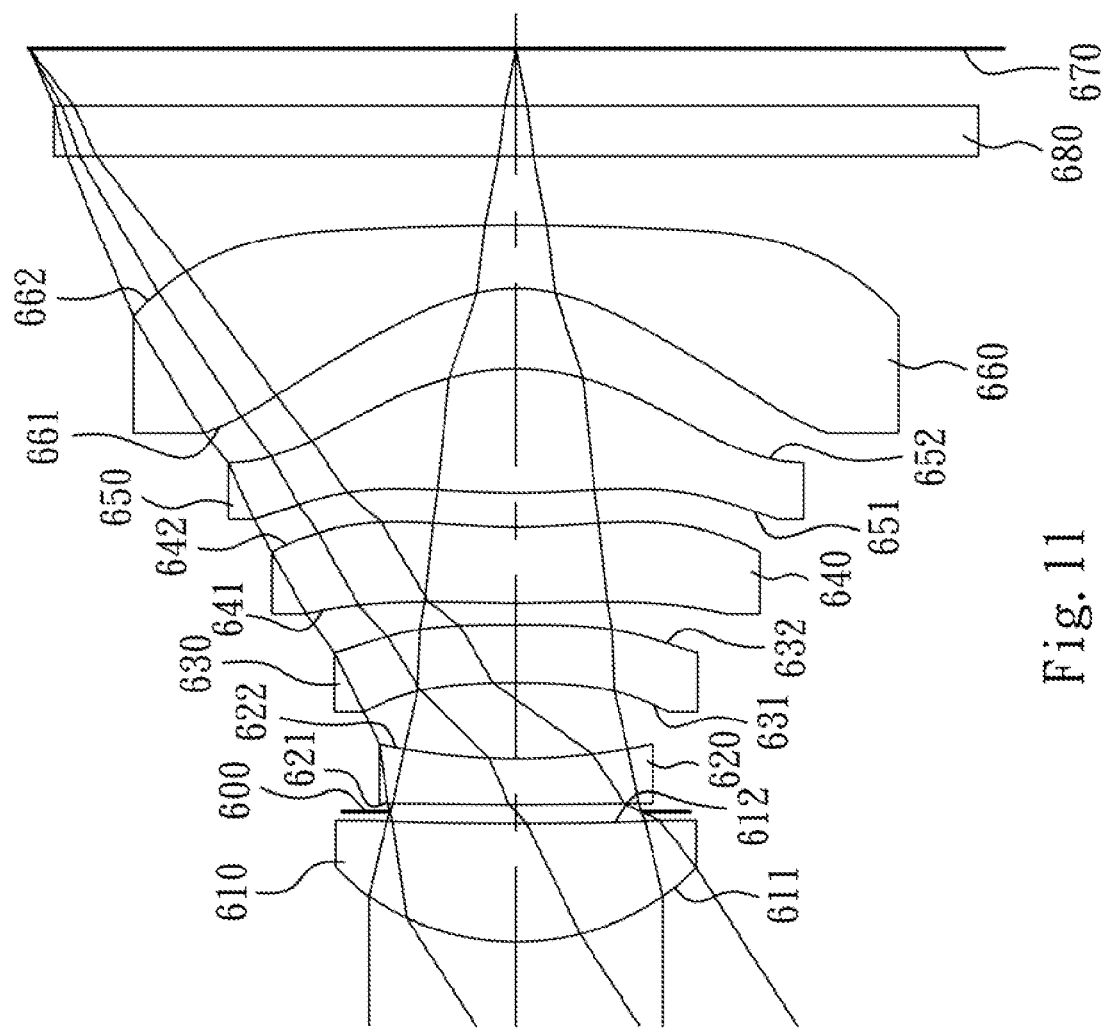
FIG. 11 is a schematic view of an optical image capturing lens assembly according to the sixth embodiment of the present disclosure.
Figure 12:
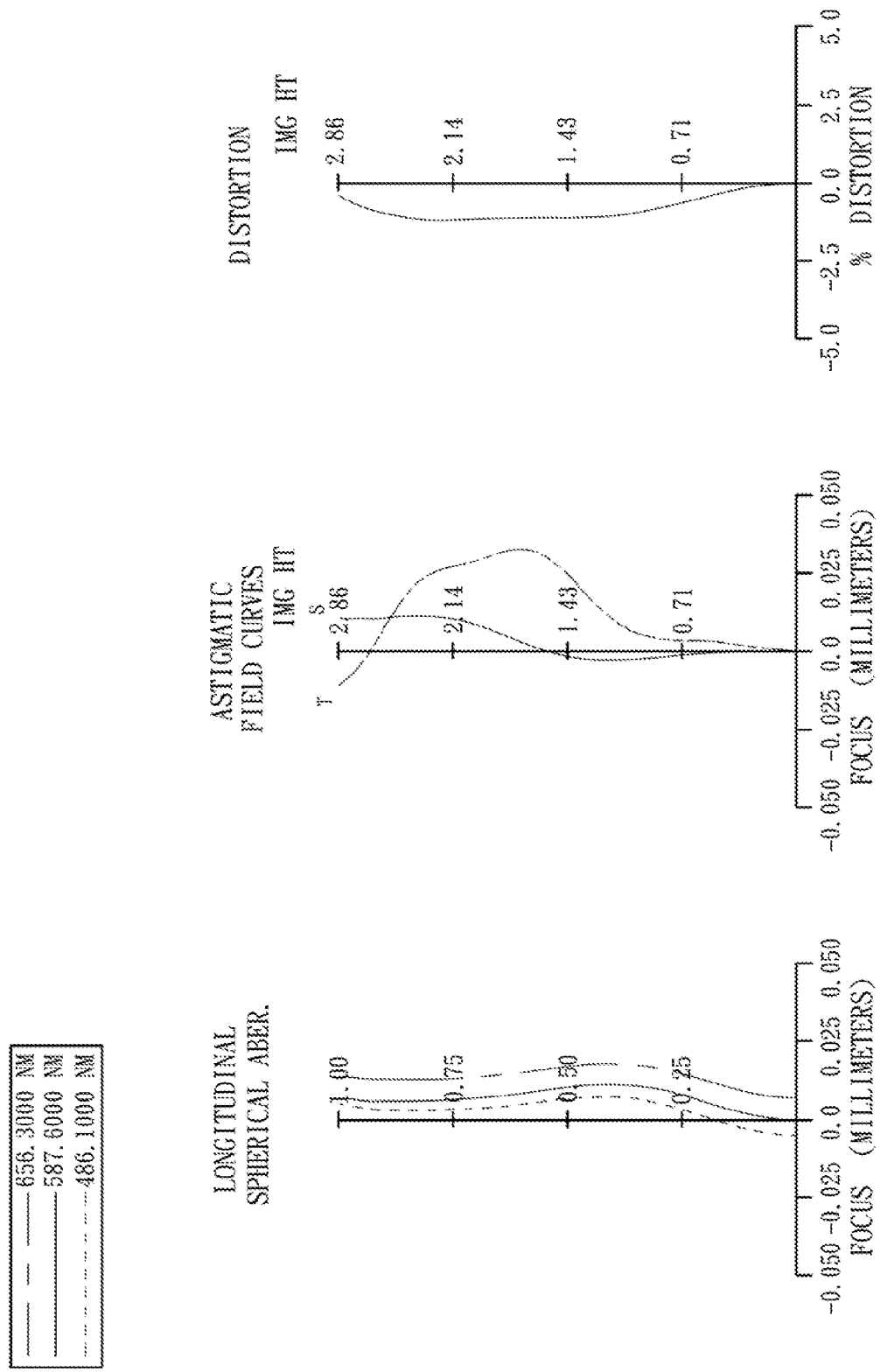
FIG. 12 shows spherical aberration curves, astigmatic field curves and a distortion curve of the optical image capturing lens assembly according to the sixth embodiment.

FIG. 11 is a schematic view of an optical image capturing lens assembly according to the sixth embodiment of the present disclosure. FIG. 12 shows spherical aberration curves, astigmatic field curves and a distortion curve of the optical image capturing lens assembly according to the sixth embodiment. In FIG. 11, the optical image capturing lens assembly includes, in order from an object side to an image side, the first lens element 610, an aperture stop 600, the second lens element 620, the third lens element 630, the fourth lens element 640, the fifth lens element 650, the sixth lens element 660, an IR cut filter 680 and an image plane 670.

The first lens element 610 is made of plastic material. The first lens element 610 with positive refractive power has a convex object-side surface 611 and a concave image-side surface 612. The object-side surface 611 and the image-side surface 612 of the first lens element 610 are aspheric.

The second lens element 620 is made of plastic material. The second lens element 620 with negative refractive power has a convex object-side surface 621 and a concave image-side surface 622. The object-side surface 621 and the image-side surface 622 of the second lens element 620 are aspheric.

The third lens element 630 is made of plastic material. The third lens element 630 with negative refractive power has a concave object-side surface 631 and a convex image-side surface 632. The object-side surface 631 and the image-side surface 632 of the third lens element 630 are aspheric. The third lens element 630 has inflection points formed on the image-side surface 632 thereof.

The fourth lens element 640 is made of plastic material. The fourth lens element 640 with negative refractive power has a convex object-side surface 641 and a concave image-side surface 642. The object-side surface 641 and the image-side surface 642 of the fourth lens element 640 are aspheric. The fourth lens element 640 has inflection points formed on the object-side surface 641 and the image-side surface 642 thereof.

The fifth lens element 650 is made of plastic material. The fifth lens element 650 with positive refractive power has a convex object-side surface 651 and a convex image-side surface 652. The object-side surface 651 and the image-side surface 652 of the fifth lens element 650 are aspheric. The fifth lens element 650 has inflection points formed on the object-side surface 651 and the image-side surface 652 thereof.

The sixth lens element 660 is made of plastic material. The sixth lens element 660 with negative refractive power has a concave object-side surface 661 and a convex image-side surface 662. The object-side surface 661 and the image-side surface 662 of the sixth lens element 660 are aspheric. The sixth lens element 660 has inflection points formed on the object-side surface 661 thereof.

The IR cut filter 680 is made of glass and located between the sixth lens element 660 and the image plane 670, and will not affect the focal length of the optical image capturing lens assembly.

The detailed optical data of the sixth embodiment are shown in Table 11 and the aspheric surface data are shown in Table 12 below.

TABLE 11

6th Embodiment
f = 4.48 mm, Fno = 2.60, HFOV = 32.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.571540 (ASP) | 0.694 | Plastic | 1.544 | 55.9 | 3.10 |
| 2 | | 19.230800 (ASP) | 0.068 | | | | |
| 3 | Ape. Stop | Plano | 0.044 | | | | |
| 4 | Lens 2 | 15.636500 (ASP) | 0.264 | Plastic | 1.650 | 21.4 | −6.66 |
| 5 | | 3.364900 (ASP) | 0.450 | | | | |
| 6 | Lens 3 | −5.664500 (ASP) | 0.338 | Plastic | 1.634 | 23.8 | −16.45 |
| 7 | | −12.689400 (ASP) | 0.124 | | | | |
| 8 | Lens 4 | 6.787700 (ASP) | 0.449 | Plastic | 1.544 | 55.9 | −13.78 |
| 9 | | 3.479800 (ASP) | 0.200 | | | | |
| 10 | Lens 5 | 4.509000 (ASP) | 0.728 | Plastic | 1.535 | 56.3 | 2.12 |
| 11 | | −1.424790 (ASP) | 0.473 | | | | |
| 12 | Lens 6 | −0.987620 (ASP) | 0.375 | Plastic | 1.535 | 56.3 | −2.05 |
| 13 | | −11.363600 (ASP) | 0.400 | | | | |
| 14 | IR-filter | Plano | 0.300 | Glass | 1.517 | 64.2 | — |
| 15 | | Plano | 0.333 | | | | |
| 16 | Image | Plano | — | | | | |

Note:
Reference wavelength (d-line) is 587.6 nm

TABLE 12

Aspheric Coefficients

| | Surface # | | | | | |
|---|---|---|---|---|---|---|
| | 1 | 2 | 4 | 5 | 6 | 7 |
| k = | −5.57418E−01 | −1.00000E+00 | −4.23235E+00 | −1.00000E+00 | 3.00000E+00 | −1.00000E+00 |
| A4 = | 2.08342E−02 | −2.52377E−02 | −8.88907E−02 | −6.89826E−02 | −1.83741E−01 | −1.94096E−01 |
| A6 = | 3.15755E−02 | 5.72343E−02 | 1.50429E−01 | 1.24953E−01 | 9.72169E−02 | 1.26503E−01 |
| A8 = | −4.52962E−02 | −1.65851E−02 | −1.47713E−01 | −1.15198E−01 | −2.43416E−01 | −1.07748E−01 |
| A10 = | 6.01010E−02 | −8.79197E−02 | 1.04206E−01 | 5.83567E−02 | 2.19690E−01 | 7.82111E−02 |
| A12 = | −3.07497E−02 | 1.19764E−01 | −1.05664E−01 | 3.10189E−02 | −2.52002E−02 | −3.67866E−03 |
| A14 = | 5.20950E−03 | −4.98156E−02 | 8.44373E−02 | −5.02271E−04 | 2.49912E−04 | −5.68720E−03 |

TABLE 12-continued

Aspheric Coefficients

| Surface # | | | | | |
|---|---|---|---|---|---|
| 8 | 9 | 10 | 11 | 12 | 13 |
| k = −1.00000E+00 | −4.04690E+01 | −4.29019E+01 | −6.55485E−01 | −1.94814E+00 | −1.00000E+00 |
| A4 = −1.68995E−01 | −1.00854E−01 | −9.34066E−02 | 5.62261E−02 | 6.97433E−02 | 3.26005E−02 |
| A6 = 8.75257E−02 | 1.19290E−02 | 9.53857E−03 | −2.84939E−02 | −3.50798E−02 | −2.08667E−02 |
| A8 = 1.14841E−03 | 2.48297E−03 | 2.73992E−03 | 3.42447E−02 | 8.31528E−03 | 3.40822E−03 |
| A10 = −2.02497E−02 | −6.16442E−04 | 2.81979E−04 | −1.10760E−02 | −6.45311E−04 | −8.19043E−05 |
| A12 = 8.36953E−03 | −1.81545E−05 | −1.00438E−04 | 1.24749E−03 | 4.29667E−05 | −3.42784E−05 |
| A14 = −1.89176E−03 | | | −1.85043E−05 | −5.70028E−06 | −3.82262E−07 |
| A16 = | | | | −7.77512E−07 | 4.47854E−07 |

In the optical image capturing lens assembly according to the sixth embodiment, the definitions of f, Fno, HFOV, V1, V2, T12, T23, ΣCT, CT6, TD, R1, R2, R3, R4, R11, f1, f345, SD, SAG11, TTL and ImgH are the same as those stated in the first embodiment with corresponding values for the sixth embodiment. Moreover, these parameters can be calculated from Tables 11 and 12 as the following values and satisfy the following relationships:

| | |
|---|---|
| f(mm) | 4.48 |
| Fno | 2.60 |
| HFOV(deg.) | 32.6 |
| V1 − V2 | 34.5 |
| T12/T23 | 0.25 |
| ΣCT/TD | 0.68 |
| (R1 + R2)/(R1 − R2) | −1.18 |
| (R3 + R4)/(R3 − R4) | 1.55 |
| R11/f | −0.22 |
| f/f1 | 1.44 |
| f/f345 | 1.72 |
| SD/TD | 0.82 |
| SAG11/CT6 | −2.26 |
| ImgH/f | 0.64 |
| TTL/ImgH | 1.80 |

Figure 13:
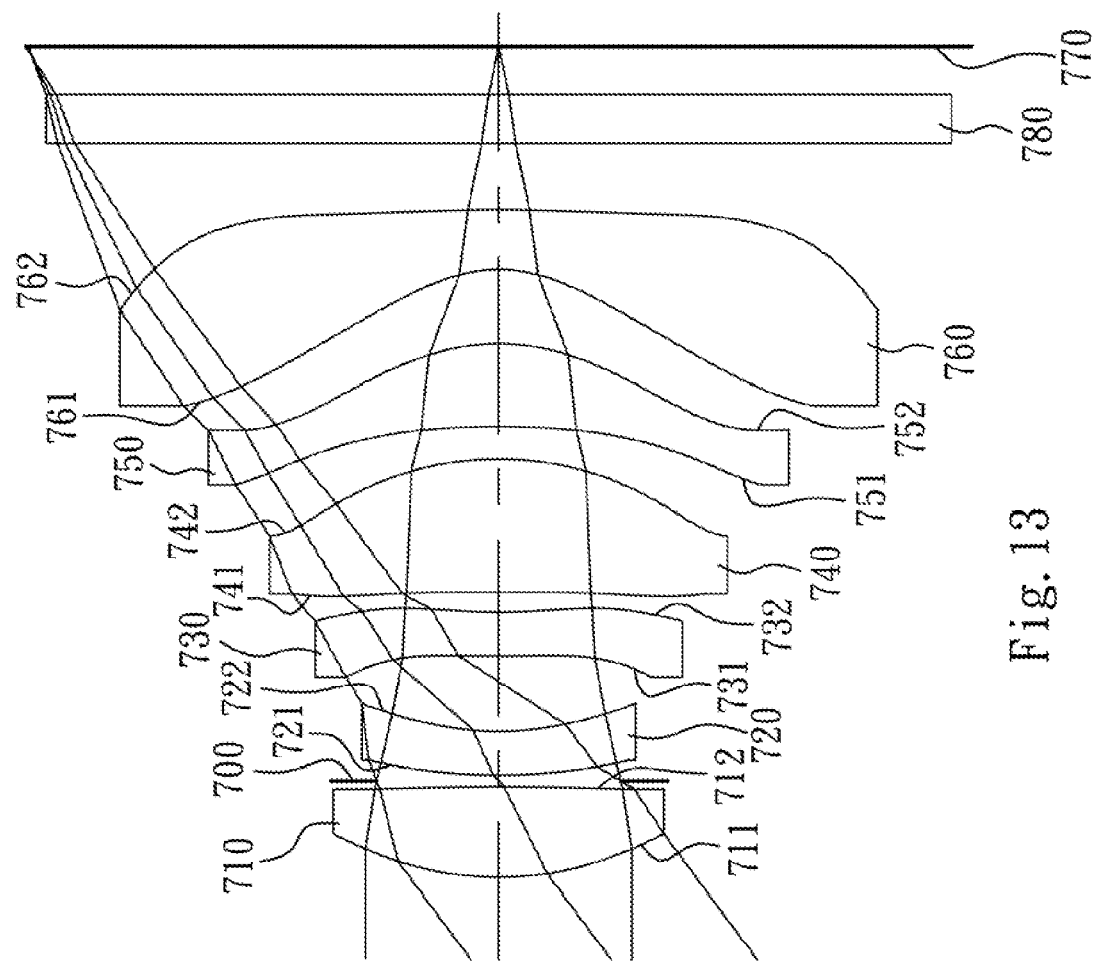
FIG. 13 is a schematic view of an optical image capturing lens assembly according to the seventh embodiment of the present disclosure.
Figure 14:
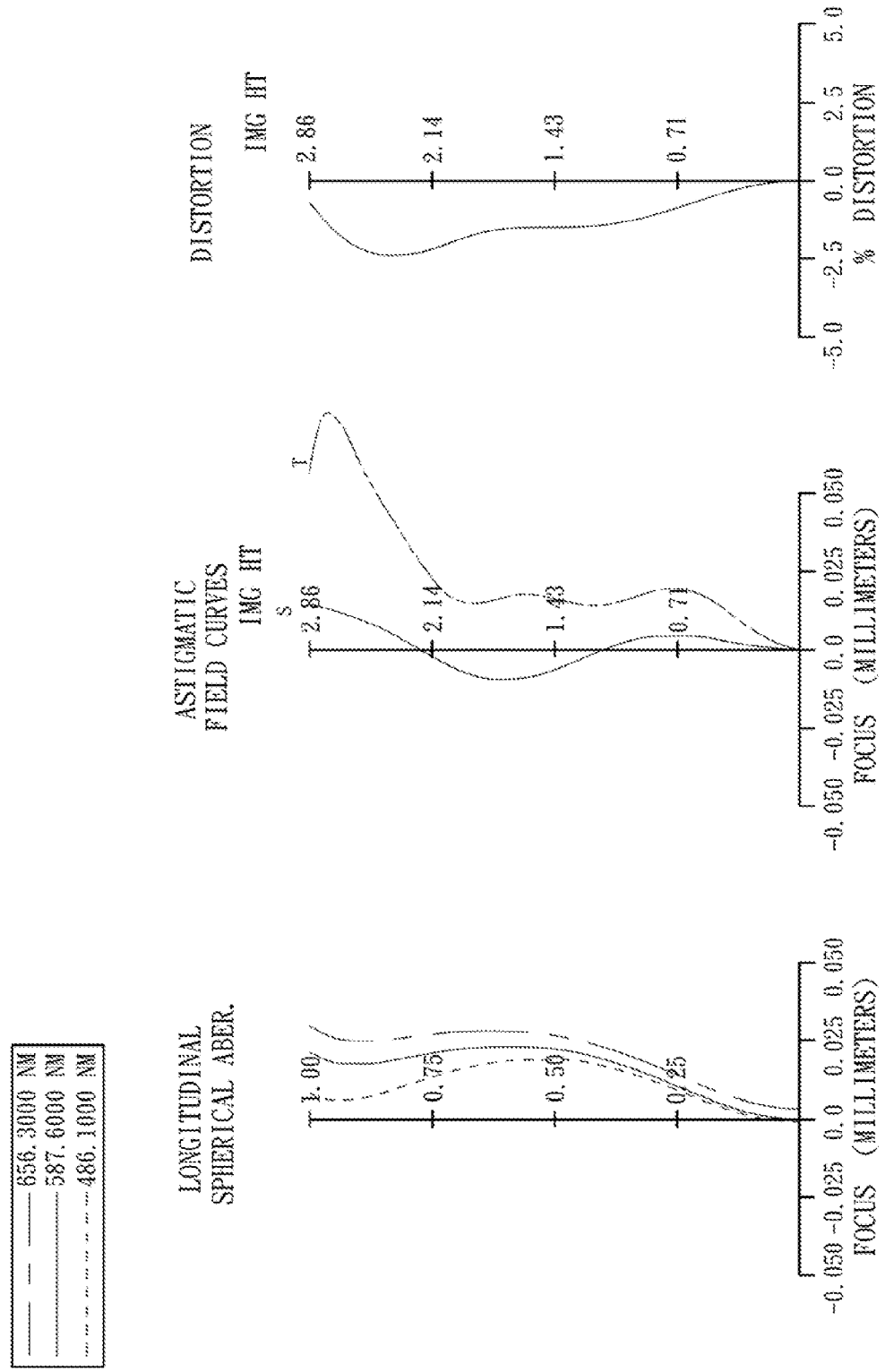
FIG. 14 shows spherical aberration curves, astigmatic field curves and a distortion curve of the optical image capturing lens assembly according to the seventh embodiment.

FIG. 13 is a schematic view of an optical image capturing lens assembly according to the seventh embodiment of the present disclosure. FIG. 14 shows spherical aberration curves, astigmatic field curves and a distortion curve of the optical image capturing lens assembly according to the seventh embodiment. In FIG. 13, the optical image capturing lens assembly includes, in order from an object side to an image side, the first lens element 710, an aperture stop 700, the second lens element 720, the third lens element 730, the fourth lens element 740, the fifth lens element 750, the sixth lens element 760, an IR cut filter 780 and an image plane 770.

The first lens element 710 is made of glass. The first lens element 710 with positive refractive power has a convex object-side surface 711 and a convex image-side surface 712. The object-side surface 711 and the image-side surface 712 of the first lens element 710 are aspheric.

The second lens element 720 is made of plastic material. The second lens element 720 with negative refractive power has a convex object-side surface 721 and a concave image-side surface 722. The object-side surface 721 and the image-side surface 722 of the second lens element 720 are aspheric.

The third lens element 730 is made of plastic material. The third lens element 730 with negative refractive power has a convex object-side surface 731 and a concave image-side surface 732. The object-side surface 731 and the image-side surface 732 of the third lens element 730 are aspheric. The third lens element 730 has inflection points formed on the object-side surface 731 and the image-side surface 732 thereof.

The fourth lens element 740 is made of plastic material. The fourth lens element 740 with positive refractive power has a convex object-side surface 741 and a convex image-side surface 742. The object-side surface 741 and the image-side surface 742 of the fourth lens element 740 are aspheric. The fourth lens element 740 has inflection points formed on the object-side surface 741 and the image-side surface 742 thereof.

The fifth lens element 750 is made of plastic material. The fifth lens element 750 with positive refractive power has a concave object-side surface 751 and a convex image-side surface 752. The object-side surface 751 and the image-side surface 752 of the fifth lens element 750 are aspheric. The fifth lens element 750 has inflection points formed on the object-side surface 751 and the image-side surface 752 thereof.

The sixth lens element 760 is made of plastic material. The sixth lens element 760 with negative refractive power has a concave object-side surface 761 and a convex image-side surface 762. The object-side surface 761 and the image-side surface 762 of the sixth lens element 760 are aspheric. The sixth lens element 760 has inflection points formed on the object-side surface 761 and the image-side surface 762 thereof.

The IR cut filter 780 is made of glass and located between the sixth lens element 760 and the image plane 770, and will not affect the focal length of the optical image capturing lens assembly.

The detailed optical data of the seventh embodiment are shown in Table 13 and the aspheric surface data are shown in Table 14 below.

TABLE 13

7th Embodiment
f = 3.87 mm, Fno = 2.40, HFOV = 36.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.979400 (ASP) | 0.551 | Glass | 1.540 | 59.7 | 3.21 |
| 2 | | −12.623500 (ASP) | 0.035 | | | | |
| 3 | Ape. Stop | Plano | 0.034 | | | | |
| 4 | Lens 2 | 3.353700 (ASP) | 0.264 | Plastic | 1.633 | 23.4 | −6.40 |
| 5 | | 1.779060 (ASP) | 0.458 | | | | |
| 6 | Lens 3 | 9.090900 (ASP) | 0.264 | Plastic | 1.633 | 23.4 | −8.47 |
| 7 | | 3.333800 (ASP) | 0.120 | | | | |
| 8 | Lens 4 | 88.053200 (ASP) | 0.807 | Plastic | 1.544 | 55.9 | 3.54 |
| 9 | | −1.964590 (ASP) | 0.200 | | | | |
| 10 | Lens 5 | −4.815000 (ASP) | 0.500 | Plastic | 1.544 | 55.9 | 2.99 |
| 11 | | −1.261940 (ASP) | 0.449 | | | | |
| 12 | Lens 6 | −0.845890 (ASP) | 0.365 | Plastic | 1.544 | 55.9 | −1.74 |
| 13 | | −8.928600 (ASP) | 0.400 | | | | |
| 14 | IR-filter | Plano | 0.300 | Glass | 1.517 | 64.2 | — |
| 15 | | Plano | 0.286 | | | | |
| 16 | Image | Plano | — | | | | |

Note:
Reference wavelength (d-line) is 587.6 nm

TABLE 14

Aspheric Coefficients

| | Surface # | | | | | |
|---|---|---|---|---|---|---|
| | 1 | 2 | 4 | 5 | 6 | 7 |
| k = | −9.87803E−01 | −1.00000E+00 | 7.21756E−01 | −1.00000E+00 | −1.00000E+01 | −1.00000E+00 |
| A4 = | 1.19189E−02 | 2.74759E−02 | −7.49505E−02 | −1.24508E−01 | −2.87843E−01 | −2.92941E−01 |
| A6 = | 1.32652E−02 | 3.99014E−02 | 1.92788E−01 | 1.77816E−01 | 1.11349E−01 | 1.78871E−01 |
| A8 = | −3.28231E−02 | −6.07463E−02 | −2.21093E−01 | −1.32836E−01 | −1.99612E−01 | −1.27065E−01 |
| A10 = | 4.17952E−02 | −5.71466E−02 | 1.32781E−01 | 1.95704E−02 | 1.78799E−01 | 7.59034E−02 |
| A12 = | −2.96506E−02 | 1.19766E−01 | −1.05670E−01 | 3.10376E−02 | −2.51915E−02 | −9.42813E−03 |
| A14 = | 5.03904E−03 | −4.98155E−02 | 8.44218E−02 | −4.70223E−04 | 2.48194E−04 | −4.34962E−03 |

| | Surface # | | | | | |
|---|---|---|---|---|---|---|
| | 8 | 9 | 10 | 11 | 12 | 13 |
| k = | −1.00000E+00 | −3.88802E−01 | 2.82999E+00 | −7.50729E−01 | −1.93753E+00 | −1.00000E+00 |
| A4 = | −1.02983E−01 | −2.10863E−02 | −2.31414E−02 | 8.30318E−02 | 9.16109E−02 | 4.92806E−02 |
| A6 = | 8.26696E−02 | 1.25304E−03 | −3.15937E−03 | −2.96885E−02 | −3.76254E−02 | −2.27772E−02 |
| A8 = | 5.12714E−03 | 1.79295E−03 | 2.26706E−03 | 3.43468E−02 | 8.23798E−03 | 2.68908E−03 |
| A10 = | −2.20525E−02 | 2.10788E−03 | 5.10046E−04 | −1.12163E−02 | −6.78276E−04 | 3.71859E−05 |
| A12 = | 7.00717E−03 | 1.16353E−03 | 5.10518E−05 | 1.20946E−03 | 4.69908E−05 | −2.87866E−05 |
| A14 = | −4.16360E−04 | | −2.56722E−05 | −1.43286E−05 | −6.43029E−06 | −2.00094E−06 |
| A16 = | | | | | −8.96491E−07 | 4.41366E−07 |

In the optical image capturing lens assembly according to the seventh embodiment, the definitions of f, Fno, HFOV, V1, V2, T12, T23, ΣCT, CT6, TD, R1, R2, R3, R4, R11, f1, f345, SD, SAG11, TTL and ImgH are the same as those stated in the first embodiment with corresponding values for the seventh embodiment. Moreover, these parameters can be calculated from Tables 13 and 14 as the following values and satisfy the following relationships:

| f(mm) | 3.87 |
|---|---|
| Fno | 2.40 |
| HFOV(deg.) | 36.6 |
| V1 − V2 | 36.3 |
| T12/T23 | 0.15 |
| ΣCT/TD | 0.68 |

-continued

| (R1 + R2)/(R1 − R2) | −0.73 |
|---|---|
| (R3 + R4)/(R3 − R4) | 3.26 |
| R11/f | −0.22 |
| f/f1 | 1.20 |
| f/f345 | 1.93 |
| SD/TD | 0.86 |
| SAG11/CT6 | −2.26 |
| ImgH/f | 0.74 |
| TTL/ImgH | 1.73 |

Figure 15:
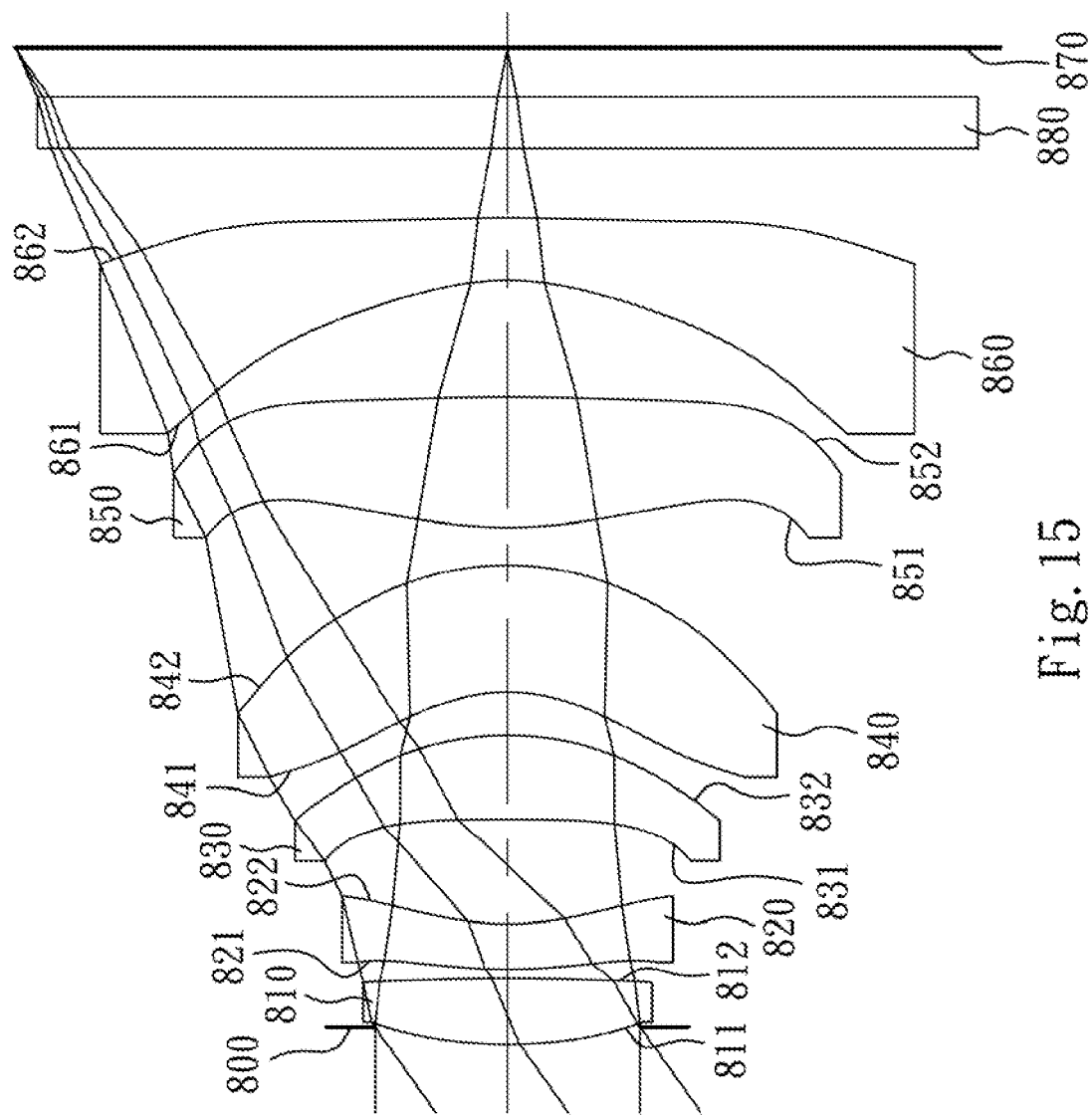
FIG. 15 is a schematic view of an optical image capturing lens assembly according to the eighth embodiment of the present disclosure.
Figure 16:
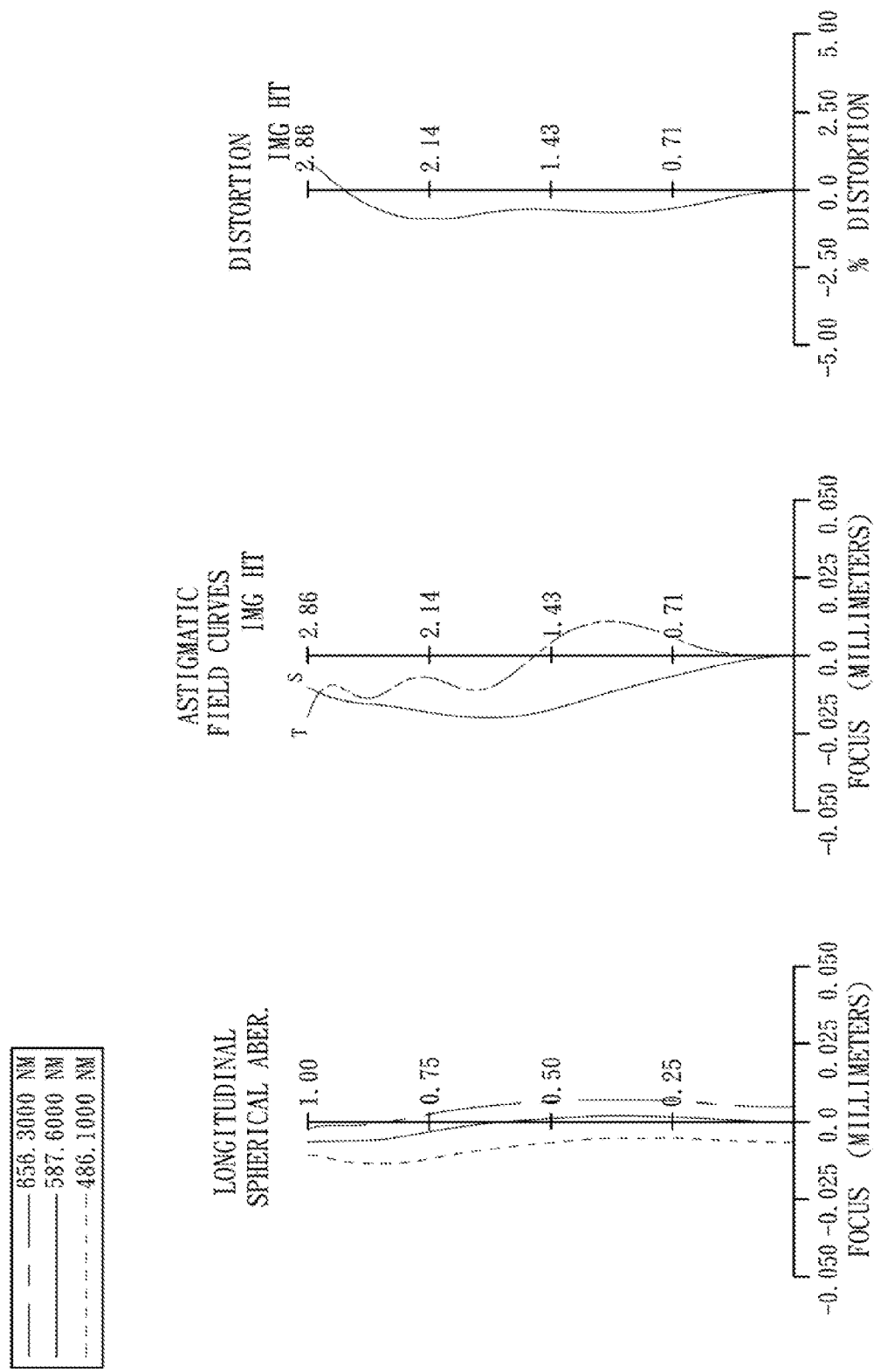
FIG. 16 shows spherical aberration curves, astigmatic field curves and a distortion curve of the optical image capturing lens assembly according to the eighth embodiment.

FIG. 15 is a schematic view of an optical image capturing lens assembly according to the eighth embodiment of the present disclosure. FIG. 16 shows spherical aberration curves, astigmatic field curves and a distortion curve of the optical image capturing lens assembly according to the eighth embodiment. In FIG. 15, the optical image capturing lens assembly includes, in order from an object side to an image side, an aperture stop 800, the first lens element 810, the second lens element 820, the third lens element 830, the fourth lens element 840, the fifth lens element 850, the sixth lens element 860, an IR cut filter 880 and an image plane 870.

The first lens element 810 is made of plastic material. The first lens element 810 with positive refractive power has a convex object-side surface 811 and a convex image-side surface 812. The object-side surface 811 and the image-side surface 812 of the first lens element 810 are aspheric.

The second lens element 820 is made of plastic material. The second lens element 820 with negative refractive power has a convex object-side surface 821 and a concave image-side surface 822. The object-side surface 821 and the image-side surface 822 of the second lens element 820 are aspheric.

The third lens element 830 is made of plastic material. The third lens element 830 with positive refractive power has a concave object-side surface 831 and a convex image-side surface 832. The object-side surface 831 and the image-side surface 832 of the third lens element 830 are aspheric.

The fourth lens element 840 is made of plastic material. The fourth lens element 840 with negative refractive power has a concave object-side surface 841 and a convex image-side surface 842. The object-side surface 841 and the image-side surface 842 of the fourth lens element 840 are aspheric.

The fourth lens element 840 has inflection points formed on the object-side surface 841 thereof.

The fifth lens element 850 is made of plastic material. The fifth lens element 850 with positive refractive power has a convex object-side surface 851 and a convex image-side surface 852. The object-side surface 851 and the image-side surface 852 of the fifth lens element 850 are aspheric. The fifth lens element 850 has inflection points formed on the object-side surface 851 and the image-side surface 852 thereof.

The sixth lens element 860 is made of plastic material. The sixth lens element 860 with negative refractive power has a concave object-side surface 861 and a convex image-side surface 862. The object-side surface 861 and the image-side surface 862 of the sixth lens element 860 are aspheric. The sixth lens element 860 has inflection points formed on the object-side surface 861 and the image-side surface 862 thereof.

The IR cut filter 880 is made of glass and located between the sixth lens element 860 and the image plane 870, and will not affect the focal length of the optical image capturing lens assembly.

The detailed optical data of the eighth embodiment are shown in Table 15 and the aspheric surface data are shown in Table 16 below.

TABLE 15

8th Embodiment
f = 4.00 mm, Fno = 2.60, HFOV = 35.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.100 | | | | |
| 2 | Lens 1 | 2.814530 (ASP) | 0.382 | Plastic | 1.544 | 55.9 | 3.97 |
| 3 | | −8.836100 (ASP) | 0.053 | | | | |
| 4 | Lens 2 | 3.012100 (ASP) | 0.265 | Plastic | 1.634 | 23.8 | −5.90 |
| 5 | | 1.611430 (ASP) | 0.608 | | | | |
| 6 | Lens 3 | −20.916900 (ASP) | 0.483 | Plastic | 1.544 | 55.9 | 3.52 |
| 7 | | −1.767410 (ASP) | 0.257 | | | | |
| 8 | Lens 4 | −1.025560 (ASP) | 0.734 | Plastic | 1.544 | 55.9 | −7.65 |
| 9 | | −1.704010 (ASP) | 0.219 | | | | |
| 10 | Lens 5 | 2.734290 (ASP) | 0.762 | Plastic | 1.544 | 55.9 | 3.98 |
| 11 | | −9.406500 (ASP) | 0.673 | | | | |
| 12 | Lens 6 | −1.541220 (ASP) | 0.365 | Plastic | 1.634 | 23.8 | −2.94 |
| 13 | | −9.671200 (ASP) | 0.400 | | | | |
| 14 | IR-filter | Plano | 0.300 | Glass | 1.517 | 64.2 | — |
| 15 | | Plano | 0.286 | | | | |
| 16 | Image | Plano | — | | | | |

Note:
Reference wavelength (d-line) is 587.6 nm.

TABLE 16

Aspheric Coefficients

| | Surface # | | | | | |
|---|---|---|---|---|---|---|
| | 2 | 3 | 4 | 5 | 6 | 7 |
| k = | 4.59211E−01 | −1.00000E+00 | −6.15125E+00 | −1.00000E+00 | 3.00000E+00 | −6.47419E+00 |
| A4 = | 3.58704E−02 | 6.90291E−02 | −1.33815E−01 | −2.20678E−01 | −1.11149E−01 | −2.02795E−01 |
| A6 = | −6.84259E−03 | −3.64802E−03 | 1.50286E−01 | 2.08004E−01 | 1.34676E−02 | 1.59395E−01 |
| A8 = | 3.95180E−02 | −1.40354E−02 | −2.28720E−01 | −2.07219E−01 | −1.33173E−01 | −1.12054E−01 |
| A10 = | −1.84286E−02 | −1.44477E−01 | 5.74185E−02 | 4.52873E−02 | 1.56517E−01 | 7.03217E−02 |
| A12 = | −4.40497E−02 | 1.46510E−01 | −4.52226E−03 | 4.64649E−02 | −8.77677E−02 | −1.90396E−02 |

TABLE 16-continued

Aspheric Coefficients

| | | | | | | |
|---|---|---|---|---|---|---|
| A14 = | 2.02865E−02 | −8.07774E−02 | −3.22445E−03 | −1.92463E−02 | 5.67334E−03 | −1.37045E−03 |

| | Surface # | | | | | |
|---|---|---|---|---|---|---|
| | 8 | 9 | 10 | 11 | 12 | 13 |
| k = | −1.77225E+00 | −7.01090E−02 | 4.25094E−01 | −3.42123E+01 | −3.99057E+00 | −1.00000E+00 |
| A4 = | −1.87883E−02 | −2.10750E−02 | −5.98817E−02 | 6.62947E−02 | 5.16104E−02 | 5.45872E−02 |
| A6 = | 1.05324E−01 | 3.84291E−02 | −1.50841E−03 | −6.39526E−02 | −3.75947E−02 | −2.51381E−02 |
| A8 = | −1.77019E−02 | −1.10625E−02 | 1.32344E−03 | 3.09375E−02 | 7.77565E−03 | 3.26444E−03 |
| A10 = | −2.55266E−02 | −2.61445E−03 | −3.95780E−04 | −9.76756E−03 | −7.79122E−04 | 9.99692E−05 |
| A12 = | 1.35501E−02 | 1.43977E−03 | −3.79609E−04 | 1.49538E−03 | 6.49114E−05 | −3.32944E−05 |
| A14 = | −2.23528E−03 | | 6.66842E−05 | −8.52511E−05 | 3.15442E−07 | −2.11243E−06 |
| A16 = | | | | | −7.59979E−07 | 3.61461E−07 |

In the optical image capturing lens assembly according to the eighth embodiment, the definitions of f, Fno, HFOV, V1, V2, T12, T23, ΣCT, CT6, TD, R1, R2, R3, R4, R11, f1, f345, SD, SAG11, TTL and ImgH are the same as those stated in the first embodiment with corresponding values for the eighth embodiment. Moreover, these parameters can be calculated from Tables 15 and 16 as the following values and satisfy the following relationships:

| | |
|---|---|
| f(mm) | 4.00 |
| Fno | 2.60 |
| HFOV(deg.) | 35.3 |
| V1 − V2 | 32.1 |
| T12/T23 | 0.09 |
| ΣCT/TD | 0.62 |
| (R1 + R2)/(R1 − R2) | −0.52 |
| (R3 + R4)/(R3 − R4) | 3.30 |
| R11/f | −0.39 |
| f/f1 | 1.01 |
| f/f345 | 1.48 |
| SD/TD | 0.98 |
| SAG11/CT6 | −2.44 |
| ImgH/f | 0.71 |
| TTL/ImgH | 1.99 |

Figure 18:
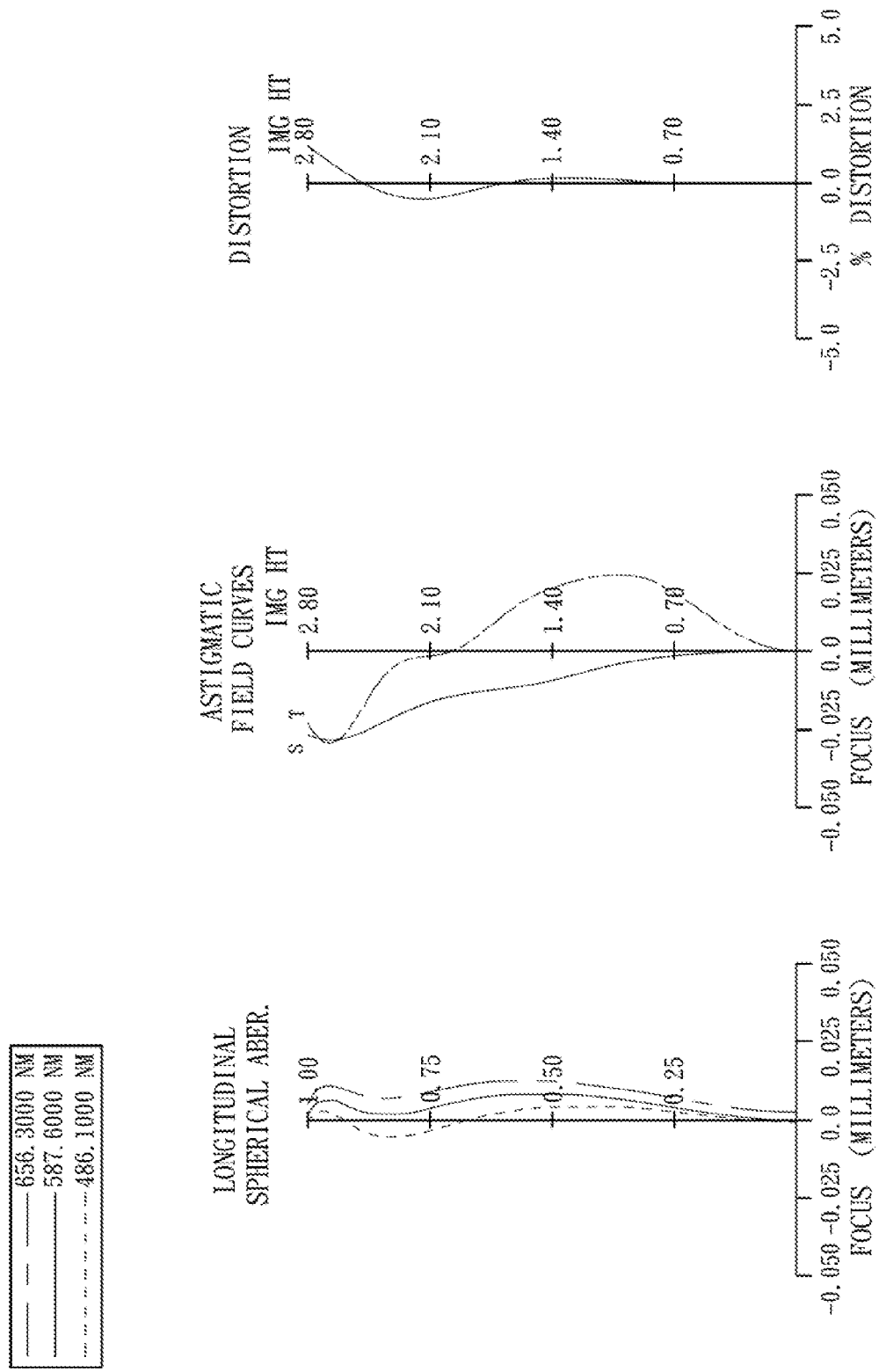
FIG. 18 shows spherical aberration curves, astigmatic field curves and a distortion curve of the optical image capturing lens assembly according to the ninth embodiment.
Figure 17:
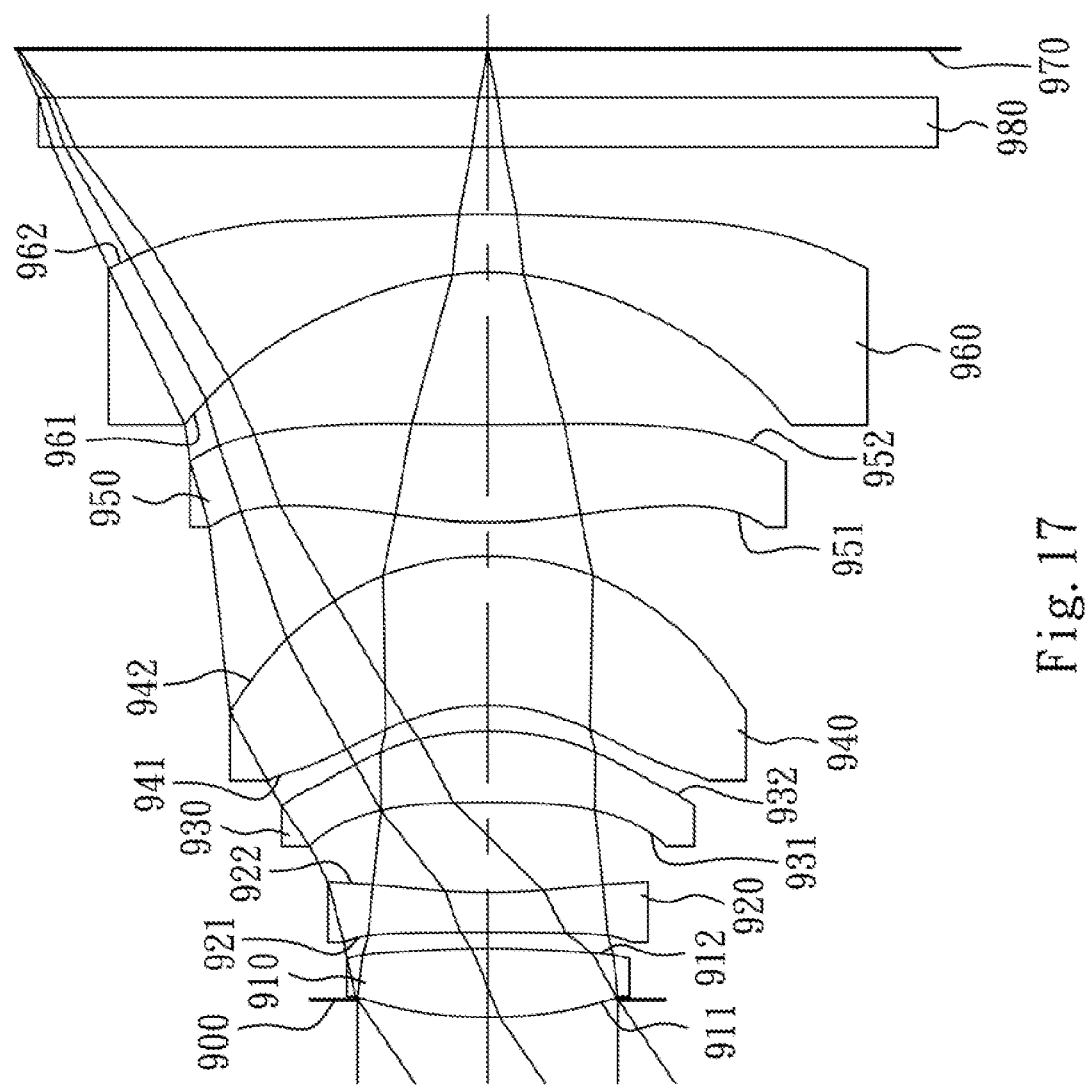
FIG. 17 is a schematic view of an optical image capturing lens assembly according to the ninth embodiment of the present disclosure.

FIG. 17 is a schematic view of an optical image capturing lens assembly according to the ninth embodiment of the present disclosure. FIG. 18 shows spherical aberration curves, astigmatic field curves and a distortion curve of the optical image capturing lens assembly according to the ninth embodiment. In FIG. 17, the optical image capturing lens assembly includes, in order from an object side to an image side, an aperture stop 900, the first lens element 910, the second lens element 920, the third lens element 930, the fourth lens element 940, the fifth lens element 950, the sixth lens element 960, an IR cut filter 980 and an image plane 970.

The first lens element 910 is made of plastic material. The first lens element 910 with positive refractive power has a convex object-side surface 911 and a convex image-side surface 912. The object-side surface 911 and the image-side surface 912 of the first lens element 910 are aspheric.

The second lens element 920 is made of plastic material. The second lens element 920 with negative refractive power has a concave object-side surface 921 and a concave image-side surface 922. The object-side surface 921 and the image-side surface 922 of the second lens element 920 are aspheric.

The third lens element 930 is made of plastic material. The third lens element 930 with positive refractive power has a concave object-side surface 931 and a convex image-side surface 932. The object-side surface 931 and the image-side surface 932 of the third lens element 930 are aspheric. The third lens element 930 has inflection points formed on the image-side surface 932 thereof.

The fourth lens element 940 is made of plastic material. The fourth lens element 940 with negative refractive power has a concave object-side surface 941 and a convex image-side surface 942. The object-side surface 941 and the image-side surface 942 of the fourth lens element 940 are aspheric. The fourth lens element 940 has inflection points formed on the object-side surface 941 thereof.

The fifth lens element 950 is made of plastic material. The fifth lens element 950 with positive refractive power has a convex object-side surface 951 and a concave image-side surface 952. The object-side surface 951 and the image-side surface 952 of the fifth lens element 950 are aspheric. The fifth lens element 950 has inflection points formed on the object-side surface 951 and the image-side surface 952 thereof.

The sixth lens element 960 is made of plastic material. The sixth lens element 960 with negative refractive power has a concave object-side surface 961 and a convex image-side surface 962. The object-side surface 961 and the image-side surface 962 of the sixth lens element 960 are aspheric. The sixth lens element 960 has inflection points formed on the image-side surface 962 thereof.

The IR cut filter 980 is made of glass and located between the sixth lens element 960 and the image plane 970, and will not affect the focal length of the optical image capturing lens assembly.

The detailed optical data of the ninth embodiment are shown in Table 17 and the aspheric surface data are shown in Table 18 below.

TABLE 17

9th Embodiment
f = 4.04 mm, Fno = 2.60, HFOV = 34.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.105 | | | | |
| 2 | Lens 1 | 2.716580 (ASP) | 0.415 | Plastic | 1.544 | 55.9 | 3.47 |
| 3 | | −5.859900 (ASP) | 0.097 | | | | |
| 4 | Lens 2 | −81.300800 (ASP) | 0.234 | Plastic | 1.634 | 23.8 | −5.43 |
| 5 | | 3.599200 (ASP) | 0.541 | | | | |
| 6 | Lens 3 | −10.592200 (ASP) | 0.422 | Plastic | 1.544 | 55.9 | 4.43 |
| 7 | | −1.992570 (ASP) | 0.154 | | | | |
| 8 | Lens 4 | −1.274750 (ASP) | 0.896 | Plastic | 1.544 | 55.9 | −40.06 |
| 9 | | −1.689280 (ASP) | 0.200 | | | | |
| 10 | Lens 5 | 3.018800 (ASP) | 0.585 | Plastic | 1.544 | 55.9 | 6.51 |
| 11 | | 19.025900 (ASP) | 0.905 | | | | |
| 12 | Lens 6 | −1.614800 (ASP) | 0.350 | Plastic | 1.634 | 23.8 | −3.25 |
| 13 | | −8.103700 (ASP) | 0.400 | | | | |
| 14 | IR-filter | Plano | 0.300 | Glass | 1.517 | 64.2 | — |
| 15 | | Plano | 0.286 | | | | |
| 16 | Image | Plano | — | | | | |

Note:
Reference wavelength (d-line) is 587.6 nm.

TABLE 18

Aspheric Coefficients

| Surface # | 2 | 3 | 4 | 5 | 6 | 7 |
|---|---|---|---|---|---|---|
| k = | −6.63733E−01 | −1.00000E+00 | −1.00000E+01 | −1.00000E+00 | −1.00000E+01 | −7.17383E−01 |
| A4 = | 2.51538E−02 | 4.92106E−02 | −9.24554E−02 | −1.42742E−01 | −1.89669E−01 | −1.94107E−01 |
| A6 = | 2.12877E−04 | 9.14506E−03 | 1.77181E−01 | 2.04054E−01 | 1.05684E−01 | 1.86597E−01 |
| A8 = | 2.99447E−02 | 1.19571E−02 | −2.49970E−01 | −2.01879E−01 | −1.76775E−01 | −9.67008E−02 |
| A10 = | −1.58989E−02 | −2.45779E−01 | 1.65944E−03 | 2.02550E−02 | 1.75293E−01 | 7.61765E−02 |
| A12 = | −3.57970E−02 | 1.40465E−01 | −6.53869E−02 | 4.33400E−02 | −6.80415E−02 | −2.09978E−02 |
| A14 = | −2.35137E−02 | −7.85840E−02 | 6.46504E−02 | 3.14825E−03 | −7.67698E−03 | −5.51006E−03 |

| Surface # | 8 | 9 | 10 | 11 | 12 | 13 |
|---|---|---|---|---|---|---|
| k = | −9.59763E−01 | −2.27883E−02 | 1.43172E+00 | −1.00000E+00 | −1.04522E+00 | −1.00000E+00 |
| A4 = | −3.39547E−02 | −1.73603E−02 | −9.07539E−02 | −2.68059E−02 | 6.62245E−02 | 4.85520E−02 |
| A6 = | 1.21096E−01 | 2.03108E−02 | −2.36163E−03 | −2.88723E−02 | −3.39234E−02 | −2.23550E−02 |
| A8 = | −1.03480E−02 | −7.11505E−03 | 1.03063E−02 | 3.03849E−02 | 8.05560E−03 | 2.90855E−03 |
| A10 = | −2.47180E−02 | −1.17205E−04 | −2.36965E−03 | −1.10453E−02 | −9.52251E−04 | 7.78240E−05 |
| A12 = | 1.27925E−02 | 5.76411E−04 | −8.22315E−04 | 1.34201E−03 | −1.45925E−05 | −3.02183E−05 |
| A14 = | −3.29967E−03 | | 2.07017E−04 | −4.20761E−06 | −9.57996E−06 | −1.92467E−06 |
| A16 = | | | | | 4.78302E−06 | 3.45387E−07 |

In the optical image capturing lens assembly according to the ninth embodiment, the definitions of f, Fno, HFOV, V1, V2, T12, T23, ΣCT, CT6, TD, R1, R2, R3, R4, R11, f1, f345, SD, SAG11, TTL and ImgH are the same as those stated in the first embodiment with corresponding values for the ninth embodiment. Moreover, these parameters can be calculated from Tables 17 and 18 as the following values and satisfy the following relationships:

| | |
|---|---|
| f(mm) | 4.04 |
| Fno | 2.60 |
| HFOV(deg.) | 34.4 |
| V1 − V2 | 32.1 |
| T12/T23 | 0.18 |
| ΣCT/TD | 0.60 |
| (R1 + R2)/(R1 − R2) | −0.37 |
| (R3 + R4)/(R3 − R4) | 0.92 |
| R11/f | −0.40 |
| f/f1 | 1.16 |
| f/f345 | 1.31 |
| SD/TD | 0.98 |
| SAG11/CT6 | −2.59 |
| ImgH/f | 0.69 |
| TTL/ImgH | 2.03 |

Figure 19:
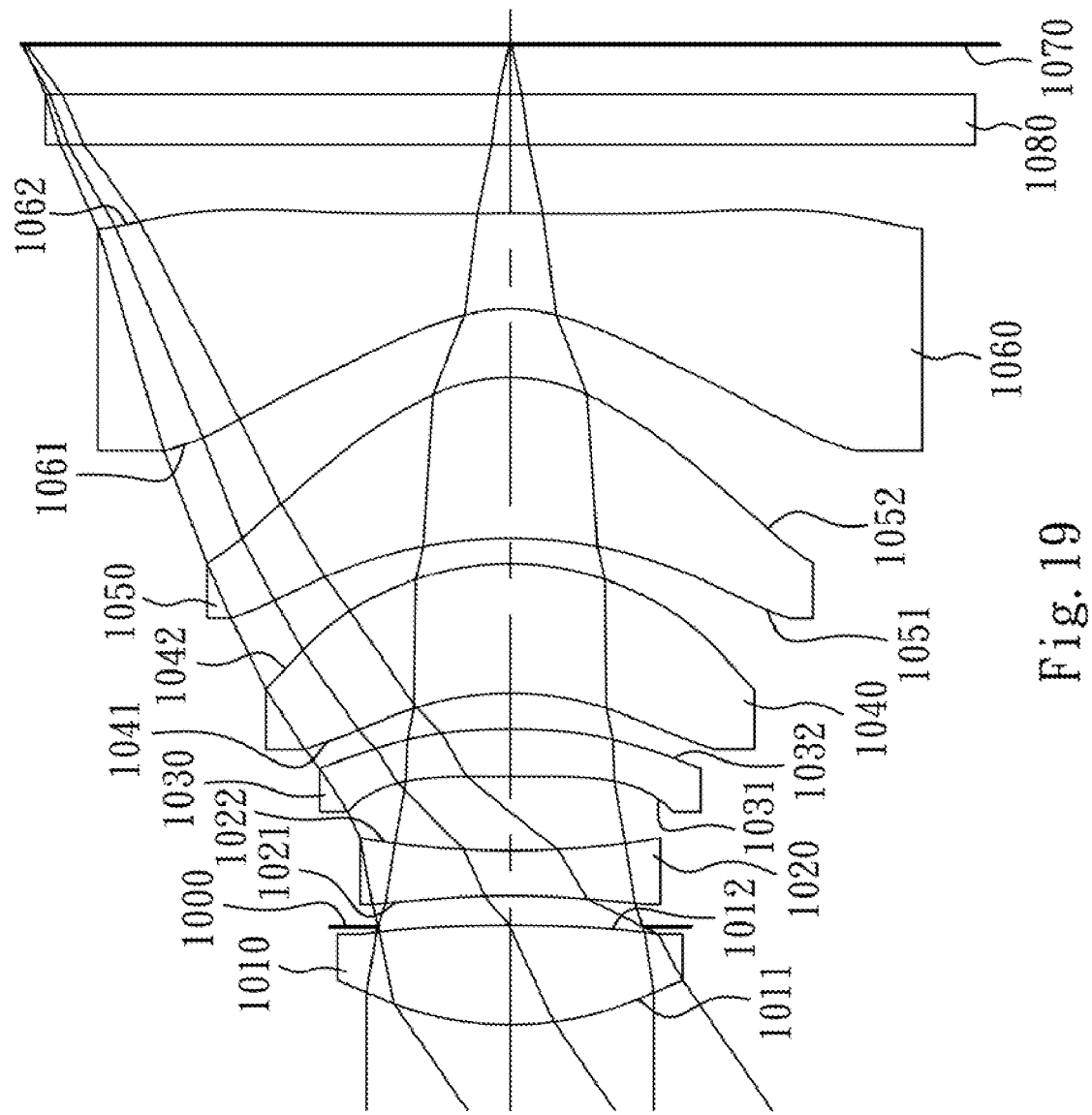
FIG. 19 is a schematic view of an optical image capturing lens assembly according to the tenth embodiment of the present disclosure.
Figure 20:
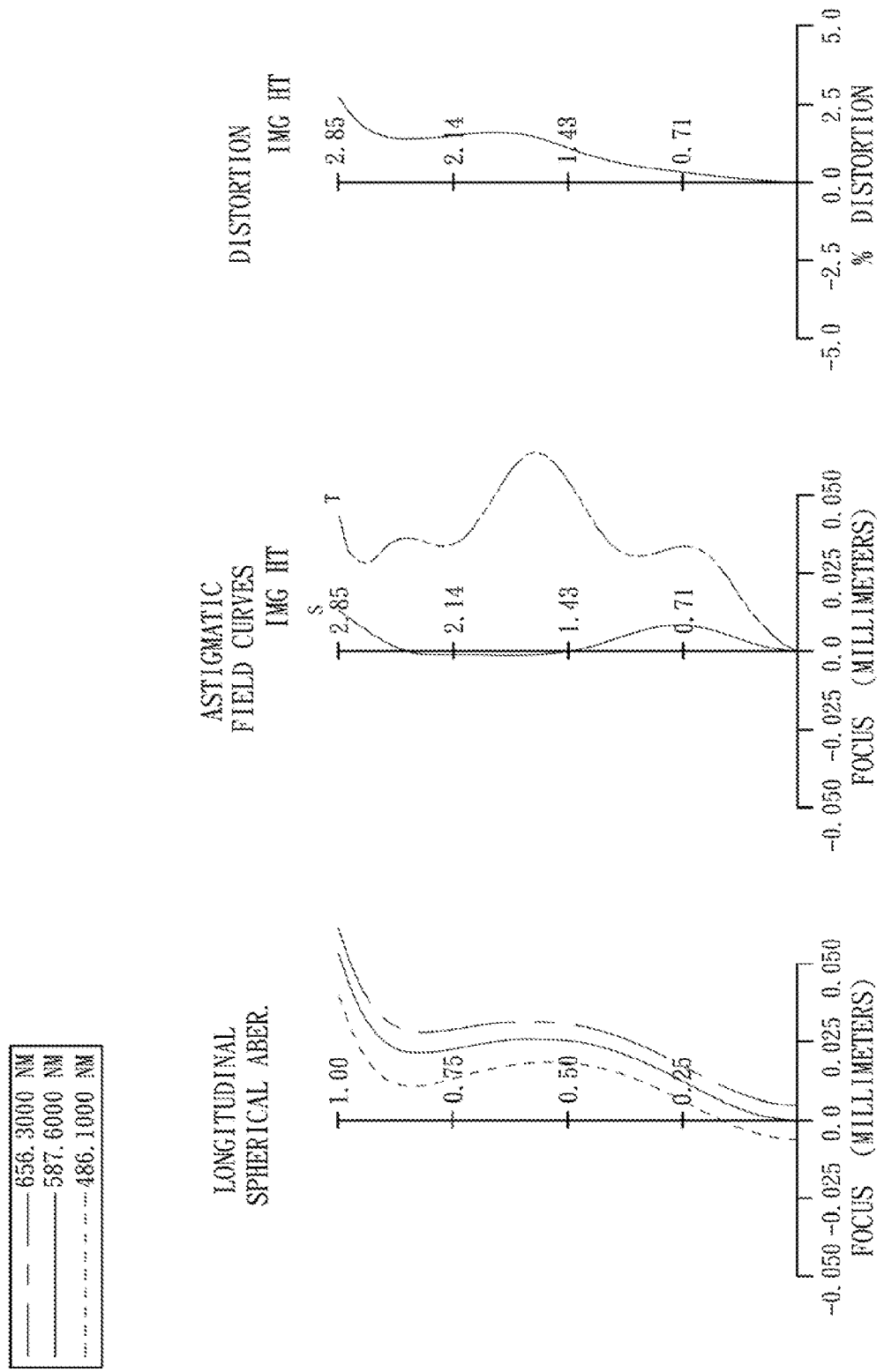
FIG. 20 shows spherical aberration curves, astigmatic field curves and a distortion curve of the optical image capturing lens assembly according to the tenth embodiment.

FIG. 19 is a schematic view of an optical image capturing lens assembly according to the tenth embodiment of the present disclosure. FIG. 20 shows spherical aberration curves, astigmatic field curves and a distortion curve of the optical image capturing lens assembly according to the tenth embodiment. In FIG. 19, the optical image capturing lens assembly includes, in order from an object side to an image side, the first lens element 1010, an aperture stop 1000, the second lens element 1020, the third lens element 1030, the fourth lens element 1040, the fifth lens element 1050, the sixth lens element 1060, an IR cut filter 1080 and an image plane 1070.

The first lens element 1010 is made of glass. The first lens element 1010 with positive refractive power has a convex object-side surface 1011 and a convex image-side surface 1012. The object-side surface 1011 and the image-side surface 1012 of the first lens element 1010 are aspheric.

The second lens element 1020 is made of plastic material. The second lens element 1020 with negative refractive power has a concave object-side surface 1021 and a concave image-side surface 1022. The object-side surface 1021 and the image-side surface 1022 of the second lens element 1020 are aspheric.

The third lens element 1030 is made of plastic material. The third lens element 1030 with positive refractive power has a convex object-side surface 1031 and a convex image-side surface 1032. The object-side surface 1031 and the image-side surface 1032 of the third lens element 1030 are aspheric. The third lens element 1030 has inflection points formed on the object-side surface 1031 thereof.

The fourth lens element 1040 is made of plastic material. The fourth lens element 1040 with positive refractive power has a concave object-side surface 1041 and a convex image-side surface 1042. The object-side surface 1041 and the image-side surface 1042 of the fourth lens element 1040 are aspheric. The fourth lens element 1040 has inflection points formed on the object-side surface 1041 and the image-side surface 1042 thereof.

The fifth lens element 1050 is made of plastic material. The fifth lens element 1050 with positive refractive power has a concave object-side surface 1051 and a convex image-side surface 1052. The object-side surface 1051 and the image-side surface 1052 of the fifth lens element 1050 are aspheric. The fifth lens element 1050 has inflection points formed on the object-side surface 1051 and the image-side surface 1052 thereof.

The sixth lens element 1060 is made of plastic material. The sixth lens element 1060 with negative refractive power has a concave object-side surface 1061 and a convex image-side surface 1062. The object-side surface 1061 and the image-side surface 1062 of the sixth lens element 1060 are aspheric. The sixth lens element 1060 has inflection points formed on the object-side surface 1061 and the image-side surface 1062 thereof.

The IR cut filter 1080 is made of glass and located between the sixth lens element 1060 and the image plane 1070, and will not affect the focal length of the optical image capturing lens assembly.

The detailed optical data of the tenth embodiment are shown in Table 19 and the aspheric surface data are shown in Table 20 below.

TABLE 19

10th Embodiment
f = 4.02 mm, Fno = 2.40, HFOV = 34.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.896240 (ASP) | 0.586 | Glass | 1.544 | 55.9 | 2.92 |
| 2 | | −8.781200 (ASP) | −0.008 | | | | |
| 3 | Ape. Stop | Plano | 0.178 | | | | |
| 4 | Lens 2 | −5.527600 (ASP) | 0.264 | Plastic | 1.614 | 25.6 | −4.17 |
| 5 | | 4.857100 (ASP) | 0.434 | | | | |
| 6 | Lens 3 | 53.614300 (ASP) | 0.277 | Plastic | 1.583 | 30.2 | 6.62 |
| 7 | | −4.156500 (ASP) | 0.213 | | | | |
| 8 | Lens 4 | −1.853530 (ASP) | 0.758 | Plastic | 1.544 | 55.9 | 9.66 |
| 9 | | −1.567880 (ASP) | 0.150 | | | | |
| 10 | Lens 5 | −2.753160 (ASP) | 0.937 | Plastic | 1.544 | 55.9 | 2.37 |
| 11 | | −0.984530 (ASP) | 0.400 | | | | |
| 12 | Lens 6 | −0.997000 (ASP) | 0.562 | Plastic | 1.607 | 26.6 | −1.73 |
| 13 | | −23.809500 (ASP) | 0.400 | | | | |
| 14 | IR-filter | Plano | 0.300 | Glass | 1.517 | 64.2 | — |
| 15 | | Plano | 0.287 | | | | |
| 16 | Image | Plano | — | | | | |

Note:
Reference wavelength (d-line) is 587.6 nm.

TABLE 20

Aspheric Coefficients

| | Surface # | | | | | |
|---|---|---|---|---|---|---|
| | 1 | 2 | 4 | 5 | 6 | 7 |
| k = | −8.77125E−01 | −1.00000E+00 | −9.94625E+00 | −1.00000E+00 | −1.11514E+00 | −1.00000E+00 |
| A4 = | 1.28360E−02 | −1.34306E−02 | −4.21808E−02 | −6.48514E−02 | −2.49968E−01 | −2.00438E−01 |
| A6 = | 1.46034E−02 | 3.42553E−02 | 1.89653E−01 | 1.32163E−01 | 1.36002E−01 | 2.09963E−01 |
| A8 = | −5.25766E−02 | −3.63518E−02 | −2.25042E−01 | −9.31531E−02 | −2.42581E−01 | −1.24098E−01 |
| A10 = | 6.13042E−02 | −8.71745E−02 | 1.46391E−01 | 2.97241E−03 | 1.12859E−01 | 7.12914E−02 |
| A12 = | −4.32660E−02 | 1.19766E−01 | −1.05664E−01 | 3.10189E−02 | −2.52004E−02 | −1.86069E−02 |
| A14 = | −2.65743E−03 | −4.98156E−02 | 8.44373E−02 | −5.02237E−04 | 2.49946E−04 | −4.64107E−03 |

TABLE 20-continued

Aspheric Coefficients

| Surface # | 8 | 9 | 10 | 11 | 12 | 13 |
|---|---|---|---|---|---|---|
| k = | −1.00000E+00 | −2.30166E+00 | 6.40726E−01 | −7.64281E−01 | −2.17333E+00 | −1.00000E+00 |
| A4 = | −8.55085E−02 | −8.84323E−03 | −9.94433E−03 | 1.08376E−01 | 9.54478E−02 | 4.06170E−02 |
| A6 = | 1.00109E−01 | −2.30422E−02 | 5.12169E−03 | −4.20513E−02 | −4.19814E−02 | −1.65135E−02 |
| A8 = | 1.11046E−02 | −9.12149E−03 | 1.71985E−03 | 3.38354E−02 | 7.84309E−03 | 2.05698E−03 |
| A10 = | −2.23439E−02 | 1.17756E−03 | 4.70577E−05 | −1.08665E−02 | −6.22936E−04 | 2.00931E−05 |
| A12 = | 5.59714E−03 | 2.03021E−03 | −1.83282E−05 | 1.30832E−03 | 5.68403E−05 | −1.71040E−05 |
| A14 = | −2.04299E−03 | | | 2.31801E−05 | −3.56301E−06 | −1.26610E−06 |
| A16 = | | | | | −3.61882E−07 | 2.79655E−07 |

In the optical image capturing lens assembly according to the tenth embodiment, the definitions of f, Fno, HFOV, V1, V2, T12, T23, ΣCT, CT6, TD, R1, R2, R3, R4, R11, f1, f345, SD, SAG11, TTL and ImgH are the same as those stated in the first embodiment with corresponding values for the tenth embodiment. Moreover, these parameters can be calculated from Tables 19 and 20 as the following values and satisfy the following relationships:

| | |
|---|---|
| f(mm) | 4.02 |
| Fno | 2.40 |
| HFOV(deg.) | 34.5 |
| V1 − V2 | 30.3 |
| T12/T23 | 0.39 |
| ΣCT/TD | 0.71 |
| (R1 + R2)/(R1 − R2) | −0.64 |
| (R3 + R4)/(R3 − R4) | 0.06 |
| R11/f | −0.25 |
| f/f1 | 1.38 |
| f/f345 | 2.29 |
| SD/TD | 0.88 |
| SAG11/CT6 | −1.47 |
| ImgH/f | 0.71 |
| TTL/ImgH | 1.97 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image capturing lens assembly comprising, in order from an object side to an image side:
    a first lens element with positive refractive power and having a convex object-side surface;
    a second lens element with refractive power;
    a third lens element with refractive power;
    a fourth lens element with refractive power;
    a fifth lens element with refractive power, wherein the object-side surface and the image-side surface of the fifth lens element are aspheric, and the fifth lens element has at least one inflection point formed on at least one of the object-side surface and the image-side surface thereof; and
    a sixth lens element with negative refractive power, and having a concave object-side surface and a convex image-side surface, wherein the object-side surface and the image-side surface of the sixth lens element are aspheric;
    wherein the optical image capturing lens assembly further comprises a stop, and when a sum of the central thickness from the first lens element to the sixth lens element is ΣCT, an axial distance between the object-side surface of the first lens element and the image-side surface of the sixth lens element is TD, and wherein an axial distance between the stop and the image-side surface of the sixth lens element is SD, and the following relationships are satisfied:

$0.5 < \Sigma CT/TD < 0.92$; and $0.7 < SD/TD < 1.2$.

2. The optical image capturing lens assembly of claim 1, wherein the sixth lens element has at least one inflection point formed on at least one of the object-side surface and the image-side surface thereof.

3. The optical image capturing lens assembly of claim 2, wherein the fifth lens element has a convex image-side surface, and the fifth lens element and the sixth lens element are made of plastic material.

4. The optical image capturing lens assembly of claim 3, wherein the second lens element has negative refractive power.

5. The optical image capturing lens assembly of claim 4, wherein a focal length of the optical image capturing lens assembly is f, a curvature radius of the object-side surface of the sixth lens element is R11, and the following relationship is satisfied:

$-0.7 < R11/f < 0$.

6. The optical image capturing lens assembly of claim 5, wherein the focal length of the optical image capturing lens assembly is f, a composite focal length of the third lens element, the fourth lens element and the fifth lens element is f345, and the following relationship is satisfied:

$1.3 < f/f345 < 2.0$.

7. The optical image capturing lens assembly of claim 5, further comprising:
    an image sensor located on an image plane, wherein a half of a diagonal length of an effective photosensitive area of the image sensor is ImgH, the focal length of the optical image capturing lens assembly is f, and the following relationship is satisfied:

$0.6 < ImgH/f < 0.9$.

8. The optical image capturing lens assembly of claim 5, wherein a horizontal distance between the position of the maximum range of the incident light passing through the object-side surface of the first lens element and the intersection point of the optical axis and the object-side surface of the first lens element is SAG11, a central thickness of the sixth lens element is CT6, and the following relationship is satisfied:

$$-3.0<SAG11/CT6<-1.0.$$

9. The optical image capturing lens assembly of claim 5, wherein a curvature radius of the object-side surface of the second lens element is R3, a curvature radius of the image-side surface of the second lens element is R4, and the following relationship is satisfied:

$$0.2<(R3+R4)/(R3-R4)<4.0.$$

10. The optical image capturing lens assembly of claim 3, wherein the Abbe number of the first lens element is V1, the Abbe number of the second lens element is V2, and the following relationship is satisfied:

$$25<V1-V2<45.$$

11. The optical image capturing lens assembly of claim 10, wherein a curvature radius of the object-side surface of the first lens element is R1, a curvature radius of the image-side surface of the first lens element is R2, and the following relationship is satisfied:

$$-1.5<(R1+R2)/(R1-R2)<-0.3.$$

12. The optical image capturing lens assembly of claim 11, wherein the optical image capturing lens assembly comprises at least four lens elements which are made of plastic material.

13. The optical image capturing lens assembly of claim 11, wherein the second lens element has a concave image-side surface, and when the focal length of the optical image capturing lens assembly is f, a focal length of the first lens element is f1, and the following relationship is satisfied:

$$1.0<f/f1<1.8.$$

14. The optical image capturing lens assembly of claim 11, wherein an axial distance between the first lens element and the second lens element is T12, an axial distance between the second lens element and the third lens element is T23, and the following relationship is satisfied:

$$0.05<T12/T23<0.8.$$

15. The optical image capturing lens assembly of claim 11, wherein the focal length of the optical image capturing lens assembly is f, the curvature radius of the object-side surface of the sixth lens element is R11, and the following relationship is satisfied:

$$-0.4<R11/f<-0.1.$$

16. The optical image capturing lens assembly of claim 2, further comprising:
an image sensor located on an image plane, wherein a half of a diagonal length of an effective photosensitive area of the image sensor is ImgH, an axial distance between the object-side surface of the first lens element and the image plane is TTL, and the following relationship is satisfied:

$$TTL/ImgH<2.1.$$

17. An optical image capturing lens assembly comprising, in order from an object side to an image side:
a first lens element with positive refractive power and having a convex object-side surface;
a second lens element with negative refractive power;
a third lens element with refractive power, wherein the object-side surface and the image-side surface of the third lens element are aspheric, and the third lens element has at least one inflection point formed on at least one of the object-side surface and the image-side surface thereof;
a fourth lens element with refractive power, wherein the object-side surface and the image-side surface of the fourth lens element are aspheric, and the fourth lens element has at least one inflection point formed on at least one of the object-side surface and the image-side surface thereof;
a fifth lens element with refractive power, wherein the object-side surface and the image-side surface of the fifth lens element are aspheric, and the fifth lens element has at least one inflection point formed on at least one of the object-side surface and the image-side surface thereof; and
a sixth lens element with negative refractive power, and having a concave object-side surface and a convex image-side surface, wherein the object-side surface and the image-side surface of the sixth lens element are aspheric, and the sixth lens element has at least one inflection point formed on at least one of the object-side surface and the image-side surface thereof;
wherein a focal length of the optical image capturing lens assembly is f, a curvature radius of the object-side surface of the sixth lens element is R11, and the following relationship is satisfied:

$$-0.7<R11/f<0.$$

18. The optical image capturing lens assembly of claim 17, wherein a sum of the central thickness from the first lens element to the sixth lens element is ΣCT, an axial distance between the object-side surface of the first lens element and the image-side surface of the sixth lens element is TD, and the following relationship is satisfied:

$$0.5<\Sigma CT/TD<0.92.$$

19. The optical image capturing lens assembly of claim 18, wherein an axial distance between the first lens element and the second lens element is T12, an axial distance between the second lens element and the third lens element is T23, and the following relationship is satisfied:

$$0.05<T12/T23<0.8.$$

20. The optical image capturing lens assembly of claim 17, wherein a horizontal distance between the position of the maximum range of the incident light passing through the object-side surface of the first lens element and the intersection point of the optical axis and the object-side surface of the first lens element is SAG11, a central thickness of the sixth lens element is CT6, and the following relationship is satisfied:

$$-3.0<SAG11/CT6<-1.0.$$

21. The optical image capturing lens assembly of claim 20, wherein the second lens element has a concave image-side surface, the fifth lens element has a convex image-side surface, the focal length of the optical image capturing lens assembly is f, the focal length of the first lens element is f1, and the following relationship is satisfied:

$$1.0<f/f1<1.8.$$

22. An optical image capturing lens assembly comprising, in order from an object side to an image side:
a first lens element with positive refractive power and having a convex object-side surface;
a second lens element with refractive power;

a third lens element with refractive power, wherein at least one of the object-side surface and the image-side surface of the third lens element is aspheric;

a fourth lens element with refractive power, wherein at least one of the object-side surface and the image-side surface of the fourth lens element is aspheric;

a fifth lens element with refractive power, wherein the object-side surface and the image-side surface of the fifth lens element are aspheric, and the fifth lens element has at least one inflection point formed on at least one of the object-side surface and the image-side surface thereof; and a sixth lens element with negative refractive power, and having a concave object-side surface and a convex image-side surface;

wherein the optical image capturing lens assembly further comprises a stop, an axial distance between the stop and the image-side surface of the sixth lens element is SD, an axial distance between the object-side surface of the first lens element and the image-side surface of the sixth lens element is TD, and the following relationship is satisfied:

$0.9 < SD/TD < 1.2.$

23. The optical image capturing lens assembly of claim 22, further comprising:

an image sensor located on the image plane, wherein a half of a diagonal length of an effective photosensitive area of the image sensor is ImgH, an axial distance between the object-side surface of the first lens element and the image plane is TTL, and the following relationship is satisfied:

$TTL/ImgH < 2.1.$

24. The optical image capturing lens assembly of claim 22, wherein the second lens element has negative refractive power and the fifth lens element has a convex image-side surface, and the optical image capturing lens assembly comprises at least four lens elements made of plastic material.

25. The optical image capturing lens assembly of claim 22, wherein a focal length of the optical image capturing lens assembly is f, a curvature radius of the object-side surface of the sixth lens element is R11, and the following relationship is satisfied:

$-0.7 < R11/f < 0.$

* * * * *